United States Patent
Ujiie et al.

(10) Patent No.: US 11,522,733 B2
(45) Date of Patent: *Dec. 6, 2022

(54) GATEWAY DEVICE DETERMINING WHETHER OR NOT RECEIVED FRAME IS APPROPRIATE

(71) Applicant: PANASONIC INTELLECTUAL PROPERTY CORPORATION OF AMERICA, Torrance, CA (US)

(72) Inventors: Yoshihiro Ujiie, Osaka (JP); Hideki Matsushima, Tokyo (JP); Toshihisa Nakano, Osaka (JP); Tohru Wakabayashi, Hyogo (JP); Hiroshi Amano, Osaka (JP); Tomoyuki Haga, Nara (JP); Takeshi Kishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 17/201,797

(22) Filed: Mar. 15, 2021

(65) Prior Publication Data

US 2021/0203525 A1    Jul. 1, 2021

Related U.S. Application Data

(63) Continuation of application No. 16/860,353, filed on Apr. 28, 2020, now Pat. No. 10,979,245, which is a
(Continued)

(30) Foreign Application Priority Data

May 30, 2016  (JP) .............................. JP2016-107352

(51) Int. Cl.
*H04L 12/40*          (2006.01)
*H04L 9/40*           (2022.01)
(Continued)

(52) U.S. Cl.
CPC ........... *H04L 12/40* (2013.01); *H04B 1/3822* (2013.01); *H04L 12/40169* (2013.01);
(Continued)

(58) Field of Classification Search
CPC .............. H04L 12/40; H04L 12/40169; H04L 12/4625; H04L 12/66; H04L 63/00;
(Continued)

(56) References Cited

U.S. PATENT DOCUMENTS 9,288,533 B1    3/2016  Di Bernardo et al.
9,794,286 B2 *  10/2017 Otsuka ................ H04L 12/4625
(Continued)

FOREIGN PATENT DOCUMENTS

JP    2005-188501 A    7/2005
JP    2007-312193 A    11/2007
(Continued)

OTHER PUBLICATIONS

The Extended European Search Report from the European Patent Office (EPO) dated May 24, 2018 for the related European Patent Application No. 16820145.7.
(Continued)

*Primary Examiner* — Deepa Belur
(74) *Attorney, Agent, or Firm* — Greenblum & Bernstein, P.L.C.

(57) ABSTRACT

A gateway device for a vehicle network system installed in a vehicle is provided. The vehicle network system includes a network, an electronic control unit connected to the network, and the gateway device connected to the first network and configured to communicate outside the vehicle.
(Continued)

The gateway device receives a first frame from outside the vehicle; determines whether or not the first frame is appropriate; generates a second frame when the first frame is not determined to be appropriate; and transmits the second frame to the network. The second frame includes control information and additional information based on content of the first frame. The control information restricts processing of the additional information included in the second frame by the electronic control unit, after the second frame is received by the electronic control unit.

13 Claims, 22 Drawing Sheets

Related U.S. Application Data continuation of application No. 15/398,815, filed on Jan. 5, 2017, now Pat. No. 10,680,847, which is a continuation of application No. PCT/JP2016/003079, filed on Jun. 27, 2016.

(60) Provisional application No. 62/212,073, filed on Aug. 31, 2015.

(51) Int. Cl.
  *H04L 12/46* (2006.01)
  *H04B 1/3822* (2015.01)
  *H04L 12/66* (2006.01)

(52) U.S. Cl.
  CPC .......... *H04L 12/4625* (2013.01); *H04L 12/66* (2013.01); *H04L 63/00* (2013.01); *H04L 63/1425* (2013.01); *H04L 63/1466* (2013.01); *H04L 2012/40215* (2013.01); *H04L 2012/40273* (2013.01)

(58) Field of Classification Search
  CPC ............ H04L 63/1425; H04L 63/1466; H04L 2012/40215; H04L 2012/40273; H04B 1/3822
  See application file for complete search history.

(56) References Cited

U.S. PATENT DOCUMENTS

| | | |
|---|---|---|
| 2002/0073243 A1 | 6/2002 | Staiger |
| 2006/0025966 A1 | 2/2006 | Kanamaru |
| 2008/0201772 A1 | 8/2008 | Mondaeev et al. |
| 2009/0235141 A1 | 9/2009 | Shelby et al. |
| 2009/0327534 A1 | 12/2009 | Koenigseder et al. |
| 2010/0080163 A1 | 4/2010 | Krishnamoorthi et al. |
| 2011/0105017 A1 | 5/2011 | Takada et al. |
| 2013/0051435 A1* | 2/2013 | Van de Maele .. H04L 12/40169 375/259 |
| 2015/0020152 A1 | 1/2015 | Litichever et al. |
| 2015/0089236 A1* | 3/2015 | Han .................... H04L 63/0227 713/168 |
| 2015/0124597 A1 | 5/2015 | Mabuchi et al. |
| 2015/0220412 A1 | 8/2015 | Mabuchi |
| 2015/0229654 A1 | 8/2015 | Perier |
| 2015/0358351 A1* | 12/2015 | Otsuka .................... H04L 12/66 726/23 |
| 2016/0059853 A1 | 3/2016 | Yamakoshi et al. |
| 2016/0173397 A1 | 6/2016 | Yajima et al. |
| 2016/0173505 A1 | 6/2016 | Ichihara |
| 2016/0205117 A1 | 7/2016 | Laifenfeld et al. |
| 2016/0315766 A1 | 10/2016 | Ujiie et al. |
| 2017/0134358 A1 | 5/2017 | Takada et al. |
| 2017/0156081 A1 | 6/2017 | Sakai et al. |
| 2017/0244477 A1 | 8/2017 | Seo et al. |
| 2017/0267193 A1 | 9/2017 | Wakita |
| 2017/0324515 A1 | 11/2017 | Vandenbaviere et al. |
| 2018/0148006 A1 | 5/2018 | Haga et al. |
| 2021/0226966 A1* | 7/2021 | Kishikawa .......... H04L 63/0281 |

FOREIGN PATENT DOCUMENTS

| | | |
|---|---|---|
| JP | 2013-074377 | 4/2013 |
| JP | 2014-146868 | 8/2014 |
| WO | WO-2021208694 A1 * | 10/2021 |

OTHER PUBLICATIONS

International Search Report of PCT application No. PCT/JP2016/003079 dated Aug. 2, 2016.

The Extended European Search Report from the European Patent Office (EPO) dated Dec. 16, 2020 for the related European Patent Application No. 20199617.0.

* cited by examiner

FIG. 4

| RECEIVED ID LIST |
| --- |
| 1 |
| 2 |
| 3 |
| 4 |
| 5 |

FIG. 5

| ID | DATA |
| --- | --- |
| 1 | 0 |
| 1 | 1 |
| 1 | 2 |
| 1 | 3 |
| 1 | 4 |
| ... | ... |

FIG. 6

| ID | DATA |
| --- | --- |
| 2 | 100 |
| 2 | 90 |
| 2 | 80 |
| 2 | 70 |
| 2 | 60 |
| ... | ... |

FIG. 7

| ID | DATA |
|---|---|
| 3 | 1 |
| 3 | 1 |
| 3 | 0 |
| 3 | 0 |
| 3 | 0 |
| ... | ... |

FIG. 8

| ID | DATA |
|---|---|
| 4 | 0 |
| 4 | 10 |
| 4 | 20 |
| 4 | 30 |
| 4 | 40 |
| ... | ... |

FIG. 9

| ID | DATA |
|---|---|
| 5 | 0 |
| 5 | 0 |
| 5 | 1 |
| 5 | 1 |
| 5 | 1 |
| ... | ... |

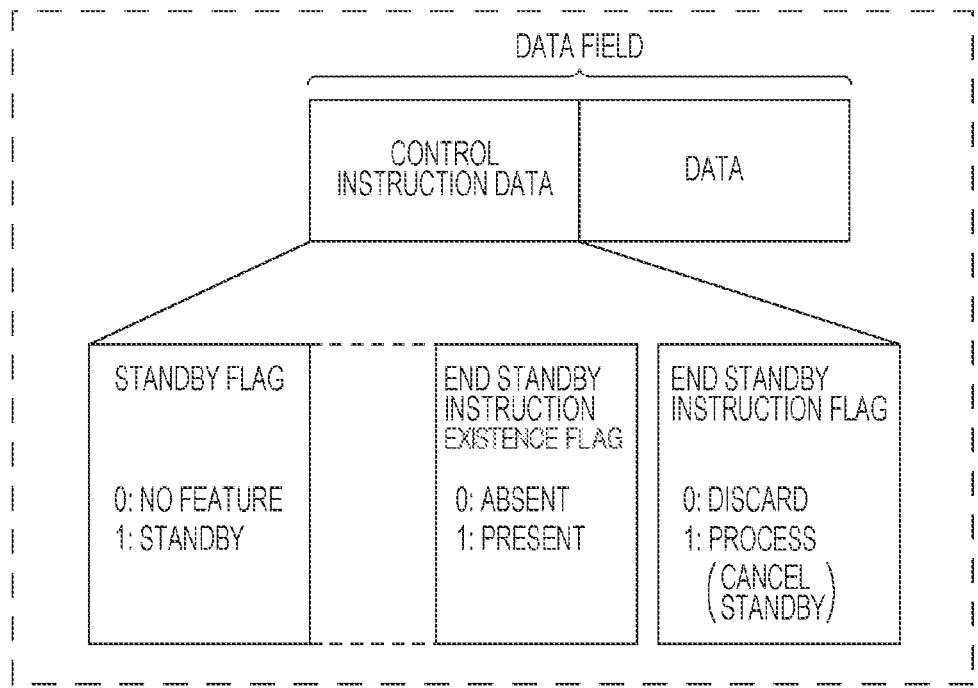

| VEHICLE NO. | ECU TYPE | ID | ABNORMAL PERIOD OCCURRENCE COUNT |
|---|---|---|---|
| 00000001 | ENGINE | 1 | 0 |
| 00000001 | BRAKE | 2 | 0 |
| 00000001 | DOOR | 3 | 0 |
| 00000001 | WINDOW | 4 | 100 |
| 00000001 | CORNER SENSOR | 5 | 200 |

GATEWAY DEVICE DETERMINING WHETHER OR NOT RECEIVED FRAME IS APPROPRIATE

CROSS-REFERENCE TO RELATED APPLICATIONS

This is a continuation of U.S. patent application Ser. No. 16/860,353, filed Apr. 28, 2020, which is a continuation of U.S. patent application Ser. No. 15/398,815, filed Jan. 5, 2017 and now U.S. Pat. No. 10,680,847 issued Jun. 9, 2020, which is a continuation of Int. Pat. Appl No. PCT/JP2016/003079, filed Jun. 27, 2016, which claims priority from U.S. Prov. Pat. Appl. No. 62/212,073, filed Aug. 31, 2015, and priority from Jap. Pat. Appl. No. 2016-107352, filed May 30, 2016. The disclosure of each of the above-mentioned documents is incorporated herein by reference in its entirety.

BACKGROUND

1. Technical Field

The present disclosure relates to a gateway device that conducts frame forwarding and the like in a vehicle network over which electronic control units communicate.

2. Description of the Related Art

Recently, in systems inside automobiles, devices called electronic control units (ECUs) are being disposed in large numbers. A network joining these ECUs is called a vehicle network. Various standards exist for vehicle networks. One of the most prevalent vehicle network standards is called a controller area network (CAN) prescribed in ISO 11898-1.

In a CAN, communication links are formed using two buses, and an ECU connected to a bus is called a node. Each node connected to a bus transmits and receives messages called frames. A transmitting node that transmits a frame applies a voltage to the two buses, and by producing a potential difference between the buses, transmits a value of "1", called recessive, and a value of "0", called dominant. When multiple transmitting nodes transmit recessive and dominant at the exact same timing, the dominant is prioritized for transmission. When there is an abnormality in the format of a received frame, the receiving node transmits a frame called an error frame. In an error frame, dominant is transmitted for 6 bits in succession, thereby notifying the transmitting node and other receiving nodes of the abnormality in the frame.

In addition, in a CAN, identifiers that indicate the destination and the source of a transmission do not exist, and instead, the transmitting node transmits (in other words, sends out signals on the buses) while attaching an ID called a message ID to each frame, while each receiving node receives (in other words, reads signals from the buses) only frames with a predetermined ID. Also, carrier sense multiple access with collision avoidance (CSMA/CA) is adopted, whereby mediation according to message ID is conducted when multiple nodes transmit simultaneously, and the frame whose message ID has the smaller value is prioritized for transmission.

For a CAN vehicle network system, there exists a threat whereby an attacker fraudulently controls an ECU by accessing the buses and transmitting fraudulent frames. Security countermeasures are being investigated.

For example, for the gateway (GW) described in Japanese Unexamined Patent Application Publication No. 2014-146868, which forwards frames between buses in a vehicle network, if the gateway detects an abnormality in the periodicity of a frame transmitted to a bus, the gateway discards that frame without forwarding the frame to the other bus, thereby minimizing fraudulent control (Japanese Unexamined Patent Application Publication No. 2014-146868).

SUMMARY

One non-limiting and exemplary embodiment provides further improvement.

In one general aspect, the techniques disclosed here feature a gateway device for a vehicle network system, the vehicle network system including a bus, a first electronic control unit connected to the bus, and the gateway device connected to the bus. The gateway device is provided with one or more memories, and circuitry which, in operation, performs operations including: receiving a first frame transmitted to the bus by the first electronic control unit; when the first frame is received, including first control information in a second frame, the second frame including information based on content of the first frame, the first control information related to a restriction on processing, the restriction on processing being after a reception of the second frame; and transmitting the second frame to the bus.

According to the present disclosure, it is possible to minimize adverse effects on a vehicle network caused by the length of time to determine whether or not a frame is appropriate, and ensure there is enough time to determine whether or not a frame is appropriate.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an example of a received ID list;

FIG. 5 is a diagram illustrating an example of IDs and data fields in frames transmitted from an ECU connected to an engine;

FIG. 6 is a diagram illustrating an example of IDs and data fields in frames transmitted from an ECU connected to a brake;

FIG. 7 is a diagram illustrating an example of IDs and data fields in frames transmitted from an ECU connected to a door open/close sensor;

FIG. 8 is a diagram illustrating an example of IDs and data fields in frames transmitted from an ECU connected to a window open/close sensor;

FIG. 9 is a diagram illustrating an example of IDs and data fields in frames transmitted from an ECU connected to a corner sensor;

FIG. 11 is a diagram illustrating an example of a data field format of a frame transmitted by a gateway according to Embodiment 1;

FIG. 12 is a diagram illustrating an example of fraud determination rules stored by a gateway;

FIG. 13 is a diagram illustrating an example of forwarding rules stored by a gateway;

Figure 1:
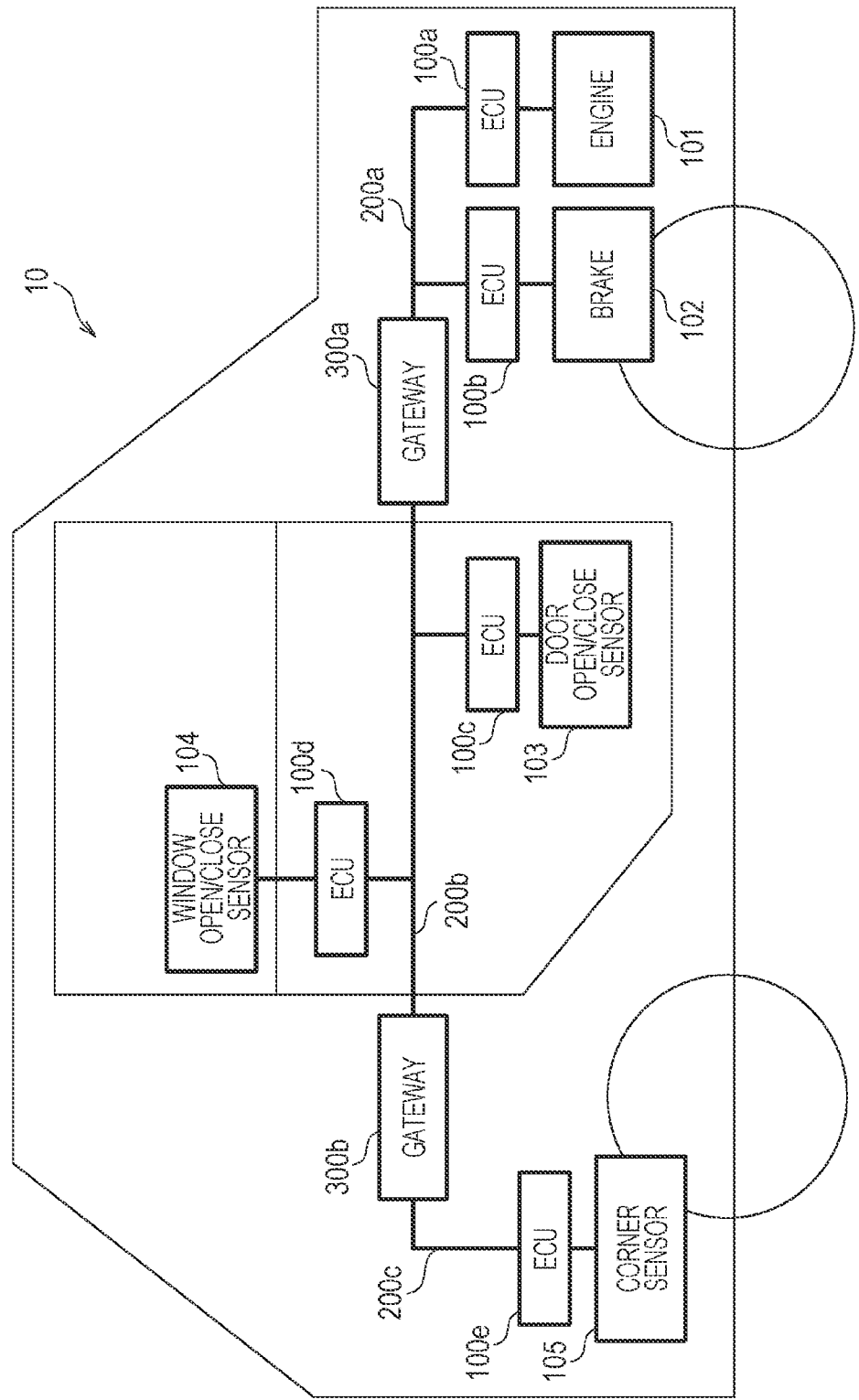
FIG. 1 is a diagram illustrating an overall configuration of a vehicle network system according to Embodiment 1.

DETAILED DESCRIPTION (Underlying Knowledge Forming Basis of the Present Disclosure)

In order for a gateway device that forwards frames to discard frames which are not appropriate, it is necessary to determine whether or not the frame is appropriate. However, the forwarding of correct frames is delayed by the amount of time taken to determine whether or not a frame is appropriate, which may adversely affect the vehicle network. For example, if the delay time is long, there is a possibility that an ECU waiting to receive a frame may execute an abnormal process.

Based on the above considerations, the inventors arrived at the aspects of the present disclosure.

A gateway device according to an aspect of the present disclosure is a gateway device for a vehicle network system, the vehicle network system including a bus, a first electronic control unit connected to the bus, and the gateway device connected to the bus. The gateway device is provided with one or more memories, and circuitry which, in operation, performs operations including: receiving a first frame transmitted to the bus by the first electronic control unit; when the first frame is received, including first control information in a second frame, the second frame including information based on content of the first frame, the first control information related to a restriction on processing, the restriction on processing being after a reception of the second frame, and transmitting the second frame to the bus. Consequently, since a frame including control information is transmitted during frame forwarding, control becomes possible in which the processing of a frame after reception may be deterred and put on standby, for example. For this reason, even in the case of using a determination technique that requires a certain amount of time to determine whether or not a received frame is appropriate, it becomes possible to add control information indicating a standby instruction or the like to a frame and transmit the control information before the determination is completed, and thereby prevent an electronic control unit (ECU) receiving the frame from executing an abnormal process or the like. In other words, it is possible to minimize adverse effects on a vehicle network system due to a gateway device needing time to determine whether or not a received frame is appropriate. Additionally, from the perspective of the gateway device, since enough time to determine whether or not the frame is appropriate may be ensured, a more suitable determination becomes possible, thereby making it possible to minimize the adverse effects of a fraudulent frame on the vehicle network.

Additionally, the second frame may be transmitted in response to a certain condition being satisfied. The operations my further include: after transmission of the second frame, transmitting a third frame to the bus, the third frame including second control information related to a processing method of the second frame. Consequently, the ECU receiving the second frame that includes the first control information becomes able to receive subsequently a third frame including second control information related to the method of processing the second frame, and thus perform handling such as holding the second frame and standing by for the third frame. In other words, the ECU receiving the second frame that includes the first control information becomes able to not start the execution of processing for the second frame until the reception timing of the third frame.

Additionally, the certain condition may include a decision of whether the first frame appropriate or not being decidable after the transmission of the second frame, and the second control information may depend on a result of the decision about whether the first frame is appropriate or not. Consequently, if the ECU receiving the second frame that includes the first control information waits to receive the third frame, the ECU becomes able to Judge whether the content of the second frame is appropriate and a functional process or the like should be executed according to that content, or the content is fraudulent and a functional process or the like should not be executed according to that content.

Additionally, the operations may further include determining whether or not the first frame is appropriate. Consequently, it becomes possible to minimize adverse effects on the vehicle network, and the gateway device, after receiving a frame, becomes able to execute a determination (decision) about whether or not a received frame is appropriate locally (with the fraud determination processing unit) using a determination technique that requires a certain amount of time.

Additionally, the vehicle network system may additionally include a second electronic control unit connected to the bus. The operations may further include receiving the result of the decision about whether or not the first frame is appropriate, the decision being made by the second electronic control unit. Consequently, adverse effects on the vehicle network may be minimized, even when using a determination technique in which the gateway device causes another ECU (such as an ECU that primarily determines whether or not frames are appropriate, for example) to make a determination (decision) about whether or not a received frame is appropriate, and receives the result.

Additionally, the operations may further include transmitting a request for the decision about whether or not the first frame is appropriate to a device external to a vehicle in which the gateway device is installed, and receiving the result of the decision about whether or not the first frame is appropriate from the external device. Consequently, adverse effects on the vehicle network may be minimized, even when using a determination technique in which the gateway device causes a device external to the vehicle (a server, for example) to make a determination (decision) about whether or not a received frame is appropriate, and receives the result. Note that according to communication with the device external to the vehicle, it becomes possible to make a determination (decision) about whether or not a frame is appropriate, based on past data for that vehicle or data about other vehicles, for example, and it may be possible to make a more suitable determination.

Additionally, the second control information may include an indication to start execution of processing of the second frame. Consequently, the ECU receiving the second frame that includes the first control information becomes able to start the execution of processing for the second frame suitably, treating the second frame as appropriate, at the timing of receiving the third frame that includes the second control information.

Additionally, the second control information may include an indication to discard the second frame. Consequently, the ECU receiving the second frame that includes the first control information becomes able to discard the second frame at the timing of receiving the third frame that includes the second control information, and not conduct an unsuitable process. Even when the frame is to be discarded, transmitting a frame including a discard instruction in this way is useful because the ECU receiving the instruction to discard is able to discard the held second frame immediately.

Additionally, the vehicle network system may additionally include a second electronic control unit connected to the bus, and the first control information may include an indication causing the second electronic control unit, that receives the second frame including the first control information, to delay starting of execution of a process corresponding to the second frame until a third frame including information related to a processing method of the second frame is received. Consequently, in the ECU receiving the second frame that includes the first control information, the execution of processing for the second frame is not started until the gateway device decides the method of processing the second frame (such as starting the execution of a corresponding process, or discarding the frame, for example). For this reason, the gateway device becomes able to secure enough processing time for making the decision.

Additionally, the vehicle network system may additionally include a second electronic control unit connected to the bus, and the first control information may include an indication causing the second electronic control unit, that receives the second frame including the first control information, to deter execution of a process corresponding to the second frame until a certain condition is satisfied. Consequently, the ECU receiving the second frame that includes the first control information is deterred from executing processing for the second frame until the gateway device takes an action for satisfying the certain condition (such as transmitting a frame indicating an instruction to start the execution of a corresponding process for the second frame, for example). For this reason, the gateway device becomes able to secure enough processing time for deciding the content of the action.

Additionally, the first electronic control unit may communicate over the bus in accordance with a controller area network (CAN) protocol. Consequently, in a case in which an attacker accesses a vehicle network in accordance with the CAN protocol and transmits a fraudulent frame, it becomes possible to judge suitably that the frame is fraudulent by using an accurate determination technique that requires a certain amount of time.

Additionally, the first control information may be included in all or part of a data field of the second frame. Consequently, the ECU receiving the frame becomes able to recognize the first control information by checking the data field. In this case, the first control information may be realized by setting a certain area inside the data field to a specific value, for example. Also, when forwarding a frame (receiving a frame and then transmitting a frame based on the received content), the gateway device becomes able to conduct forwarding efficiently by keeping the content of the received frame the same to a certain degree (by keeping content such as the ID field unchanged, for example).

Additionally, the first control information may be included in an extended identification (ID) field of the second frame. Consequently, the ECU receiving the frame becomes able to recognize the first control information by checking the extended ID field. In this case, the first control information may be realized by setting a certain area inside the extended ID field to a specific value, for example.

Additionally, the first control information may be included in a data length code (DLC) field of the second frame. Consequently, the ECU receiving the frame becomes able to recognize the first control information by checking the DLC field. In this case, the first control information may be realized by setting a certain area inside the DLC field to a specific value, for example.

Additionally, the first control information may be included in one area of the second frame that stores data reflecting content of at least part of a data field of the second frame. Consequently, since the first control information is incorporated into data reflecting the content of the data field (such as redundant data for verifying the content, for example), the first control information may be expressed efficiently, without adding a new data area.

Additionally, the first control information may be incorporated into a cyclic redundancy check (CRC) stored in a CRC field of the second frame. Consequently, since the first control information is incorporated into the CRC, the first control information may be expressed efficiently.

Additionally, the first control information may be incorporated into a checksum stored in the one area of the second frame. Consequently, since the first control information is incorporated into the checksum, the first control information may be expressed efficiently on a vehicle network in which frames including checksums are transmitted and received.

Additionally, the first control information may be incorporated into a message authentication code (MAC) stored in the one area of the second frame. Consequently, since the first control information is incorporated into the message authentication code (MAC), the first control information may be expressed efficiently on a vehicle network in which frames including MACs are transmitted and received.

Additionally, the second frame may include a forwarding destination, and the restriction on processing may restrict processing at the forwarding destination.

In addition, a vehicle network system according to an aspect of the present disclosure is a vehicle network system, comprising a bus, a first electronic control unit connected to the bus, and a gateway device connected to the bus. The gateway device may include one or more memories, and circuitry which, in operation, performs operations including: receiving a first frame transmitted to the bus by the first electronic control unit; when the first frame is received, including first control information in a second frame, the second frame including information based on content of the first frame, the first control information related to a restriction on processing, the restriction on processing being after a reception of the second frame; and transmitting the second frame to the bus. Consequently, since a frame including the first control information is transmitted from the gateway device when a frame is received (at the reception timing), adverse effects on the vehicle network may be minimized, even if the gateway device needs time until after the frame is transmitted to make a determination (decision) about whether or not the received frame is appropriate. This is because the ECU receiving the frame that includes the first control information may be prevented from conducting an abnormal process or the like due to delayed frame reception.

In addition, a communication method according to an aspect of the present disclosure is a communication method for a vehicle network system, the vehicle network system including a bus, a first electronic control unit connected to the bus, and a gateway device connected to the bus. The method is conducted by the gateway device and may include: receiving a first frame transmitted to the bus by the first electronic control unit; when the first frame is received, including first control information in a second frame, the second frame including information based on content of the first frame, the first control information related to a restriction on processing, the restriction on processing being after a reception of the second frame, and transmitting the second frame to the bus. Consequently, in a device that forwards frame, since the second frame including the first control information is transmitted when the first frame is received, adverse effects on the vehicle network may be minimized, even if time until after transmitting the first frame is needed to make a determination (decision) about whether or not the first frame is appropriate.

Note that these general or specific aspects may also be realized by a system, method, integrated circuit, computer program, or computer-readable recording medium such as a CD-ROM disc, and may also be realized by an arbitrary combination of a system, method, integrated circuit, computer program, and recording medium.

Hereinafter, a vehicle network system including a gateway device according to an embodiment will be described with reference to the drawings. Each of the embodiments indicated herein illustrates a specific example of the present disclosure. Consequently, features such as numerical values, structural elements, layout positions and connection states of structural elements, as well as steps and the ordering of steps indicated in the following embodiments are merely examples, and are not intended to limit the present disclosure. Among the structural elements in the following embodiments, structural elements that are not described in the independent claims are arbitrary or optional structural elements. Also, the drawings are diagrammatic views, and are not necessarily drawn strictly.

Embodiment 1

Hereinafter, as an embodiment of the present disclosure, a vehicle network system 10 in which multiple electronic control units (ECUs) communicate over buses will be described using the drawings.

The vehicle network system 10 includes a gateway device that receives a frame, and forwards the frame to one bus. The gateway device judges whether or not time is needed to make a final decision (determination) about whether or not the received frame is appropriate, adds a flag to the frame according to the judgment result, and forwards the frame. By referencing the flag, the ECU that receives the frame is able to judge whether it is undecided as to whether or not the frame is appropriate. If the flag indicates undecided, the ECU that receives the frame is able to defer a process corresponding to that frame (that is, deter the process while keeping the frame) and stand by for further instructions (instructions issued after deciding whether or not the frame is appropriate). If the flag indicates undecided in this way, from the perspective of the ECU, the flag may act as control information instructing the ECU to stand by. In the present embodiment, the gateway device adds control instruction data including the flag to the frame.

1.1 Overall Configuration of Vehicle Network System 10

FIG. 1 is a diagram illustrating an overall configuration of the vehicle network system 10 according to Embodiment 1. The vehicle network system 10 is an example of a network communication system that communicates in accordance with the CAN protocol, and is a network communication system in an automobile having various types of equipment, such as control devices and sensors, installed on-board. The vehicle network system 10 is configured to include buses 200a, 200b, and 200c, and respective nodes connected to the buses, such as gateways 300a and 300b, and ECUs such as ECUs 100a to 100e connected to various types of equipment. Note that, although omitted from FIG. 1, the vehicle network system 10 may include a number of ECUs other than the ECUs 100a to 100e. An ECU is a device that includes components such as a processor (microprocessor), digital circuits such as memory, analog circuits, and communication circuits. The memory is memory such as ROM and RAM, and is able to store a control program (computer program) executed by the processor. For example, by having the processor operate by following the control program (computer program), the ECU realizes various functions. Note that the computer program herein is made up of a plural combination of instruction codes indicating commands to the processor in order to achieve a designated function.

Each of the ECUs 100a to 100e is connected to one of the buses, and is connected to an engine 101, a brake 102, a door open/close sensor 103, a window open/close sensor 104, and a corner sensor 105, respectively. Each of the ECUs 100a to 100e acquires the state of the connected equipment (such as the engine 101), and periodically transmits information such as a frame expressing the state on the network (that is, the bus).

The gateways 300a and 300b are gateway devices that connect multiple different communication pathways, and forward data between communication pathways. The gateway 300a connects the bus 200a joining the ECU 100a and the ECU 100b to the bus 200b joining the ECU 100c and the ECU 100d. Also, the gateway 300b connects the bus 200b joining the ECU 100c and the ECU 100d to the bus 200c joining the ECU 100e.

The gateways 300a and 300b include a function of performing a conditional determination related to whether a frame (data frame) received from one bus is appropriate or fraudulent, adding control instruction data to the data field according to the determination result, and forwarding the received frame to another bus. The forwarding of a frame with added control instruction data in the gateways 300a and 300b is realized by generating a transmission frame including information based on the content of the frame received from one bus, including, in the data field of the transmission frame, control instruction data related to a restriction on processing after receiving the transmission frame in an ECU, and transmitting the transmission frame to another bus. The gateways 300a and 300b may also toggle whether or not to forward a received frame for each bus-to-bus connection. The gateways 300a and 300b are also a type of ECU.

In the vehicle network system 10, respective ECUs exchange frames in accordance with the CAN protocol. Frames in the CAN protocol include data frames, remote frames, overload frames, and error frames, but the description herein will focus primarily on data frames.

1.2 Data Frame Format

Hereinafter, a data frame, which is one of the frames used on a network following the CAN protocol, will be described.

Figure 2:
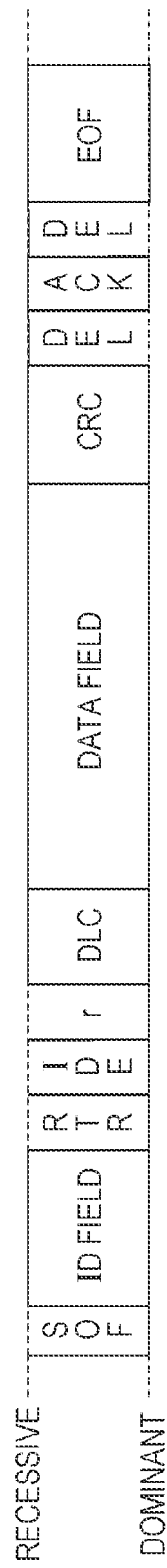
FIG. 2 is a diagram illustrating the data frame format prescribed by the CAN protocol.

FIG. 2 is a diagram illustrating the data frame format prescribed by the CAN protocol. FIG. 2 illustrates a data frame in the standard ID format prescribed by the CAN protocol. A data frame is made up of the following fields: Start of Frame (SOF), ID field, Remote Transmission Request (RTR), Identifier Extension (IDE), reserved bit "r", Data Length Code (DLC), data field, cyclic redundancy check (CRC) sequence, CRC delimiter "DEL", Acknowledgement (ACK) slot, ACK delimiter "DEL", and End of Frame (EOF).

The SOF is made up of one bit in the dominant state. The idle state of a bus is recessive, and changing to dominant with the SOF is a notification of the start of the transmission of a frame.

The ID field is an 11-bit field storing an ID (message ID), which is a value indicating the type of data. When multiple nodes start transmission at the same time, to conduct communication mediation with the ID field, the frame having the ID with the smaller value is designed to take higher priority.

The RTR is a value for distinguishing between a data frame and a remote frame, and is made up of one dominant bit in a data frame.

The IDE and "r" are both made up of one dominant bit.

The DLC is made up of 4 bits, and is a value indicating the length of the data field. Note that the IDE, "r", and the DLC are collectively designated the control field. Herein, the 4 bits that store the value of the DLC in a data frame are also called the DLC field.

The data field is made up of a maximum of 64 bits, and is a value indicating the content of the data to be transmitted. The length is adjustable in units of 8 bits. The format of the data to be sent is not prescribed by the CAN protocol, and is decided by the vehicle network system 10. Consequently, the data format depends on factors such as the model of the car and the manufacturer.

The CRC sequence is made up of 15 bits, and is computed according to the transmitted values of the SOF, the ID field, the control field, and the data field.

The CRC delimiter is made up of one recessive bit, and is a delimiter indicating the end of the CRC sequence. Note that the CRC sequence and the CRC delimiter are collectively designated the CRC field.

The ACK slot is made up of one bit. The transmitting node sets the ACK slot to recessive for transmission. If the receiving node is able to receive up through the CRC sequence correctly, the receiving node transmits the ACK slot as dominant. Since dominant is prioritized over recessive, if the ACK slot is dominant after transmission, the transmitting node is able to confirm that one of the receiving nodes received data successfully.

The ACK delimiter is made up of one recessive bit, and is a delimiter indicating the end of the ACK.

The EOF is made up of seven recessive bits, and indicates the end of the data frame.

1.3 Configuration of ECU 100a

Figure 3:
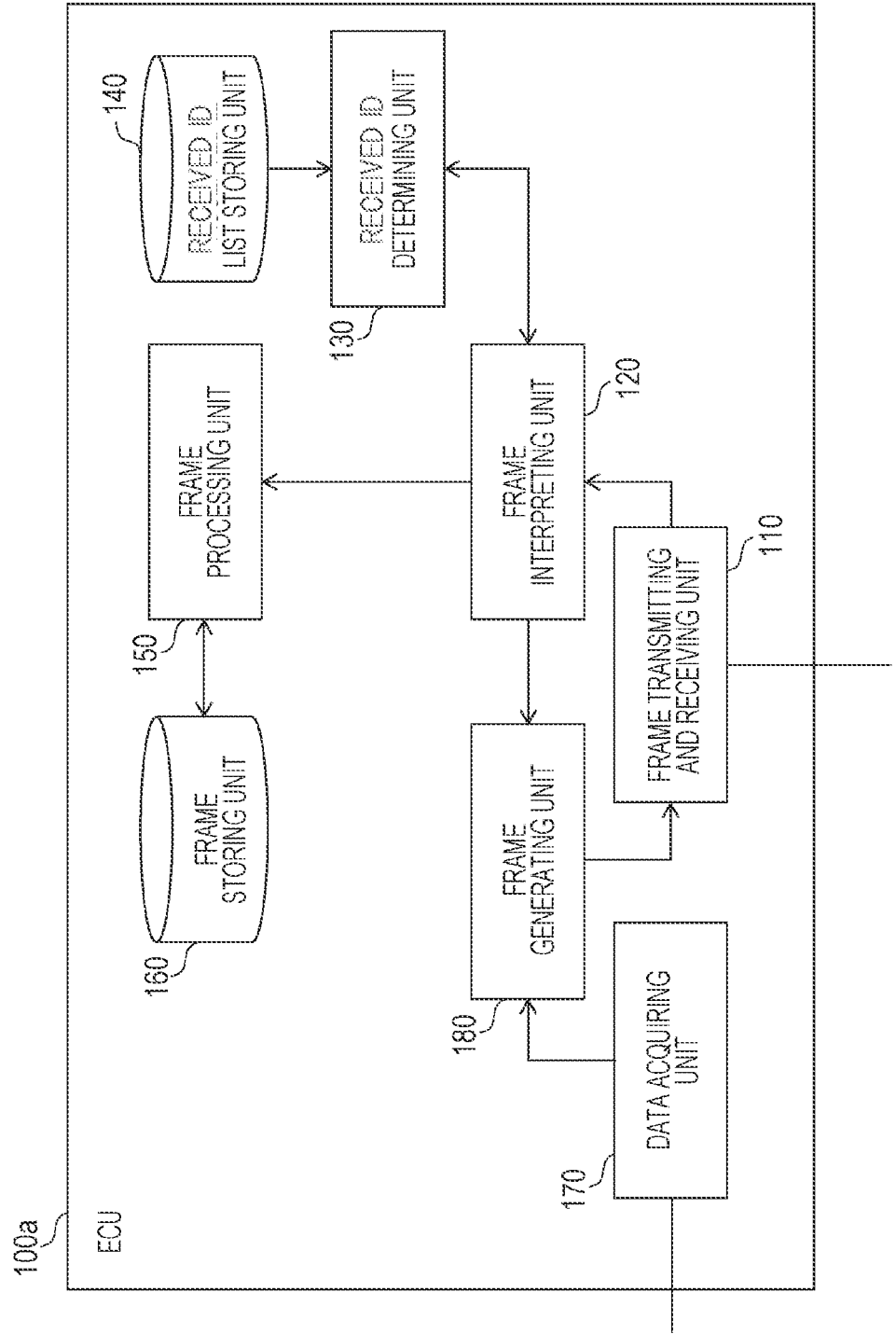
FIG. 3 is a configuration diagram of an ECU.

FIG. 3 is a configuration diagram of the ECU 100a. The ECU 100a is configured to include a frame transmitting and receiving unit 110, a frame interpreting unit 120, a received ID determining unit 130, a received ID list storing unit 140, a frame processing unit 150, a frame storing unit 160, a data acquiring unit 170, and a frame generating unit 180. The respective functions of these structural elements are realized by components in the ECU 100a, such as a communication circuit, a processor that executes a control program stored in memory, or a digital circuit.

The frame transmitting and receiving unit 110 transmits and receives frames in accordance with the CAN protocol to and from the bus 200a. The frame transmitting and receiving unit 110 receives a frame one bit at a time from the bus 200a, and forwards the received frame to the frame interpreting unit 120. Additionally, the frame transmitting and receiving unit 110 transmits the content of a frame received in a notification from the frame generating unit 180 to the bus 200a.

The frame interpreting unit 120 receives the values of a frame from the frame transmitting and receiving unit 110, and conducts interpretation to map the values to each field in the frame format prescribed by the CAN protocol. The value determined to be the ID field is forwarded to the received ID determining unit 130. Depending on a determination result in a notification from the received ID determining unit 130, the frame interpreting unit 120 decides whether to forward the value of the ID field and the data field appearing after the ID field to the frame processing unit 150, or stop the reception of the frame after receiving the determination result (in other words, stop interpretation for that frame). In addition, in the case of determining that the frame does not adhere to the CAN protocol, the frame interpreting unit 120 notifies the frame generating unit 180 to transmit an error frame. Also, if an error frame is received, or in other words, if a received frame is interpreted to be an error frame from a value in the frame, the frame interpreting unit 120 discards the rest of the frame, or in other words, stops interpretation of the frame.

The received ID determining unit 130 receives the value of the ID field indicated in a notification from the frame interpreting unit 120, and follows a message ID list stored by the received ID list storing unit 140 to determine whether or not to receive each field in the frame following the ID field. The received ID determining unit 130 reports the determination result to the frame interpreting unit 120.

The received ID list storing unit 140 stores a received ID list, which is a list of IDs (message IDs) that the ECU 100a is to receive. FIG. 4 is a diagram illustrating an example of a received ID list.

The frame processing unit 150 conducts a process related to a different function for each ECU according to the data of the received frame. For example, the ECU 100a connected to the engine 101 is equipped with a function of emitting an alarm sound if the door is open while in a state in which the speed exceeds 30 km. The ECU 100a includes a device such as a speaker for emitting the alarm sound, for example. Additionally, the frame processing unit 150 of the ECU 100a manages data received from other ECUs (for example, information indicating the state of a door), and conducts a process such as emitting an alarm sound under a certain condition based on the speed acquired from the engine 101. Note that the frame processing unit 150 may also conduct processing related to data in frames other than those given as an example herein. Additionally, depending on the content of control instruction data in a received frame, the frame processing unit 150 stores the received frame in the frame storing unit 160 in accordance with a save instruction and deters the start of the above process in response to the received frame (the process related to the function of the ECU) until a certain condition is satisfied (in other words, the above process is kept in standby until a certain condition is established), or alternatively, reads out the frame from the frame storing unit 160 and executes a process related to the function of the ECU in response to the data in the frame.

The frame storing unit 160 holds the information of a received frame in a storage medium such as memory, in accordance with a save instruction from the frame processing unit 150. The frame storing unit 160 also reports a saved frame in accordance with a readout instruction from the frame processing unit 150.

The data acquiring unit 170 acquires data indicating the states of components such as equipment and sensors connected to the ECU, and notifies the frame generating unit 180.

The frame generating unit 180 constructs an error frame in accordance with a notification of instructions to transmit an error frame from the frame interpreting unit 120, and passes the error frame to the frame transmitting and receiving unit 110 for transmission. Additionally, the frame generating unit 180 constructs a frame by attaching a predetermined message ID to the value of the data reported by the data acquiring unit 170, and passes the constructed frame to the frame transmitting and receiving unit 110.

Note that the ECUs 100b to 100e likewise are equipped with a configuration basically similar to the ECU 100a discussed above. However, the content of the received ID list stored in the received ID list storing unit 140 may be different for each ECU. Also, the content of the process by the frame processing unit 150 is different for each ECU. For example, the content of the process by the frame processing unit 150 in the ECU 100c includes a process related to a function of emitting an alarm sound if a door is opened in a situation in which the brake is not applied. For example, the frame processing unit 150 in the ECU 100b and the ECU 100d does not conduct any particular process. Note that each ECU may also be equipped with functions other than those given as an example herein. Note that the contents of frames transmitted by each of the ECUs 100a to 100e will be described later using FIGS. 5 to 9.

1.4 Accepted ID List Example

FIG. 4 is a diagram illustrating an example of a received ID list stored in each of the ECUs 100a to 100e and the gateways 300a and 300b. The received ID list illustrated as an example in FIG. 6 is used to selectively receive and process frames including a message ID whose ID (message ID) value is any of "1", "2", "3", "4", and "5". For example, if the received ID list in FIG. 4 is held in the received ID list storing unit 140 of the ECU 100a, for frames with a message ID that is not any of "1", "2", "3", "4", and "5", interpretation of the frame after the ID field by the frame interpreting unit 120 is aborted.

1.5 Example of Transmission Frames from ECU 100a Related to Engine

FIG. 5 is a diagram illustrating an example of an ID (message ID) and a data field (data) in frames transmitted from the ECU 100a connected to the engine 101. The message ID of frames transmitted by the ECU 100a is "1". The data expresses the speed (km/h), takes a value over a range from a minimum of 0 (km/h) to a maximum of 180 (km/h), with a data length of 1 byte. From the top row to the bottom row of FIG. 5, each message ID and data corresponding to each frame transmitted successively from the ECU 100a is illustrated as an example, expressing a situation of accelerating from 0 km/h in units of 1 km/h.

1.6 Example of Transmission Frames from ECU 100b Related to Brake

FIG. 6 is a diagram illustrating an example of an ID (message ID) and a data field (data) in frames transmitted from the ECU 100b connected to the brake 102. The message ID of frames transmitted by the ECU 100b is "2". The data expresses the degree of brake application as a percentage (%), with a data length of 1 byte. This percentage treats 0(%) as the state in which the brake is not being applied at all, and 100(%) as the state in which the brake is being applied to the fullest extent. From the top row to the bottom row of FIG. 6, each message ID and data corresponding to each frame transmitted successively from the ECU 100b is illustrated as an example, expressing a situation of gradually easing up on the brake from 100%.

1.7 Example of Transmission Frames from ECU 100c Related to Door Open/Close Sensor FIG. 7 is a diagram illustrating an example of an ID (message ID) and a data field (data) in frames transmitted from the ECU 100c connected to the door open/close sensor 103. The message ID of frames transmitted by the ECU 100c is "3". The data expresses the open or closed state of a door, with a data length of 1 byte. A data value of "1" indicates the door in the open state, while "0" indicates the door in the closed state. From the top row to the bottom row of FIG. 7, each message ID and data corresponding to each frame transmitted successively from the ECU 100c is illustrated as an example, expressing a situation of the door progressively transitioning from the open state to the closed state.

1.8 Example of Transmission Frames from ECU 100d Related to Window Open/Dose Sensor FIG. 8 is a diagram illustrating an example of an ID (message ID) and a data field (data) in frames transmitted from the ECU 100d connected to the window open/close sensor 104. The message ID of frames transmitted by the ECU 100d is "4". The data expresses the open or closed state of a window as a percentage (%), with a data length of 1 byte. This percentage treats 0(%) as the state in which the window is fully closed, and 100(%) as the state in which the window is fully open. From the top row to the bottom row of FIG. 8, each message ID and data corresponding to each frame transmitted successively from the ECU 100d is illustrated as an example, expressing a situation of the window gradually opening from the closed state.

1.9 Example of Transmission Frames from ECU 100e Related to Corner Sensor

FIG. 9 is a diagram illustrating an example of an ID (message ID) and a data field (data) in frames transmitted from the ECU 100e connected to the corner sensor 105. The message ID of frames transmitted by the ECU 100e is "5". The data is "1" if the corner sensor 105 detects the presence of an obstacle in a fixed distance range from a corner of the vehicle, and "0" if an obstacle is not detected. From the top row to the bottom row of FIG. 9, each message ID and data corresponding to each frame transmitted successively from the ECU 100e is illustrated as an example, expressing a situation of progressively transitioning from a state in which an obstacle to a corner of the vehicle is not detected to a state in which an obstacle is detected.

1.10 Configuration of Gateway 300a

Figure 10:
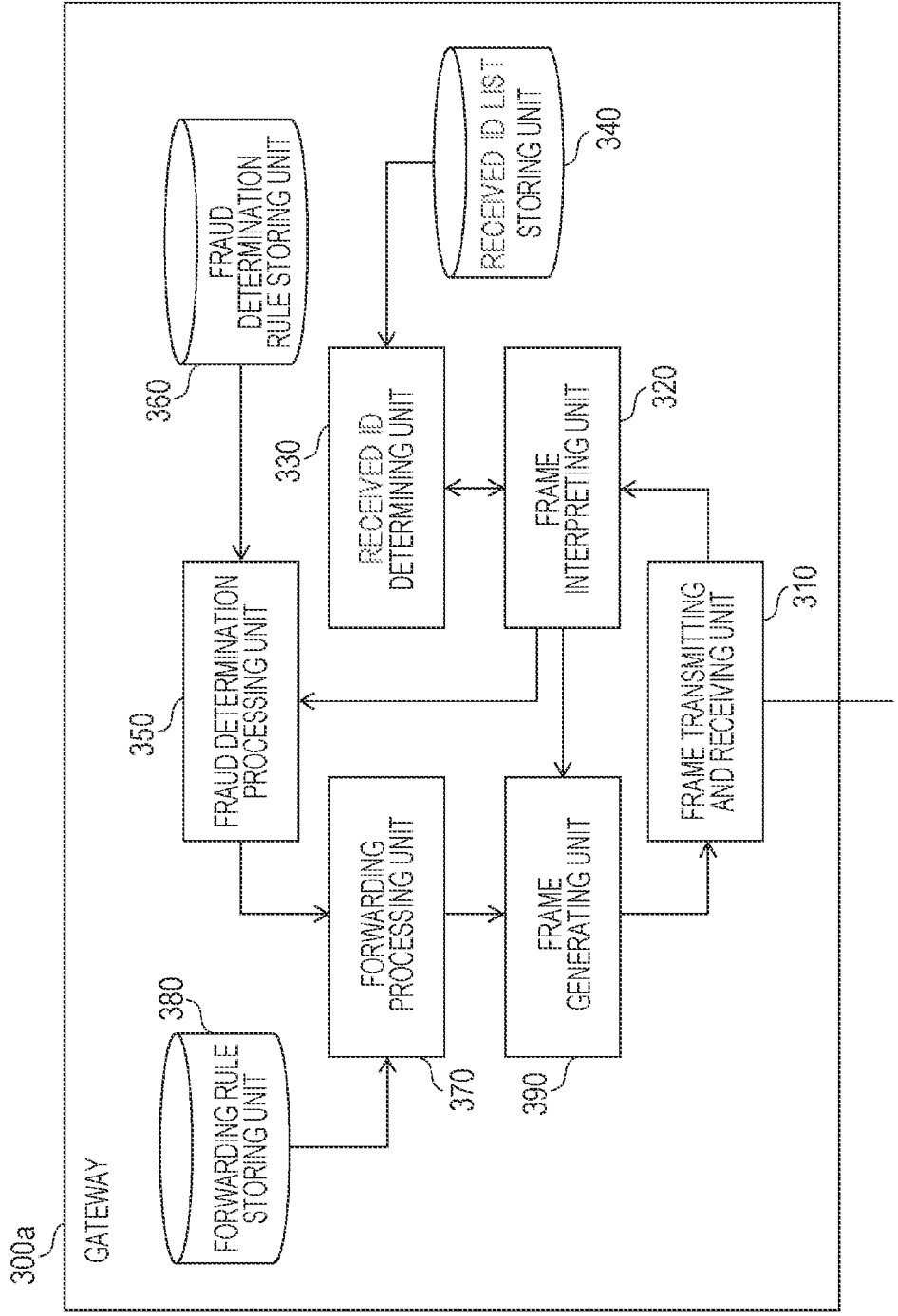
FIG. 10 is a configuration diagram of a gateway (gateway device) according to Embodiment 1.

FIG. 10 is a configuration diagram of the gateway 300a. The gateway 300a is configured to include a frame transmitting and receiving unit 310, a frame interpreting unit 320, a received ID determining unit 330, a received ID list storing unit 340, a fraud determination processing unit 350, a fraud determination rule storing unit 360, a forwarding processing unit 370, a forwarding rule storing unit 380, and a frame generating unit 390. The respective functions of these structural elements are realized by components in the gateway 300a, such as a communication circuit, a processor that executes a control program stored in memory, or a digital circuit. Note that the gateway 300b likewise is equipped with a configuration basically similar to the gateway 300a.

The frame transmitting and receiving unit 310 transmits and receives frames in accordance with the CAN protocol to and from each of the buses 200a and 200b. The frame transmitting and receiving unit 310 receives a frame one bit at a time from a bus, and forwards the received frame to the frame interpreting unit 320. Additionally, based on bus information indicating the bus of the destination and a frame reported by the frame generating unit 390, the frame transmitting and receiving unit 310 transmits the content of the frame one bit at a time to the buses 200a and 200b.

The frame interpreting unit 320 receives the values of a frame from the frame transmitting and receiving unit 310, and conducts interpretation to map the values to each field in the frame format prescribed by the CAN protocol. The value determined to be the ID field is forwarded to the received ID determining unit 330. Depending on a determination result reported by the received ID determining unit 330, the frame interpreting unit 320 decides whether to forward the value of the ID field and the data field (data) appearing after the ID field to the fraud determination processing unit 350, or stop the reception of the frame after receiving the determination result. In addition, in the case of determining that the frame does not adhere to the CAN protocol, the frame interpreting unit 320 notifies the frame generating unit 390 to transmit an error frame. Also, if an error frame is received, or in other words, if a received frame is interpreted to be an error frame from a value in the frame, the frame interpreting unit 320 discards the rest of the frame, or in other words, stops interpretation of the frame.

The received ID determining unit 330 receives the value of the ID field reported by the frame interpreting unit 320, and follows a message ID list stored by the received ID list storing unit 340 to determine whether or not to receive each field in the frame following the ID field. The received ID determining unit 330 reports the determination result to the frame interpreting unit 320.

The received ID list storing unit 340 stores a received ID list (see FIG. 4), which is a list of IDs (message IDs) that the gateway 300a is to receive.

The fraud determination processing unit 350 receives the value of the ID field reported by the frame interpreting unit 320, and conducts a fraud determination process related to whether the received frame is fraudulent or appropriate, based on fraud determination rules stored in the fraud determination rule storing unit 360 (information associating message IDs with periods on which frames are transmitted). In the fraud determination process, when a frame is received, it is judged whether or not it is possible to decide whether or not the frame is appropriate, and according to the judgment result, the content of control instruction data to add to the data field of a transmission frame for forwarding is selected, and the control instruction data is reported to the forwarding processing unit 370. If it is not possible to decide rapidly whether or not a frame is appropriate when the frame is received, or in other words, if there is a possibility that the decision of whether or not the frame is appropriate may be decided after rapidly forwarding the received frame, the fraud determination processing unit 350 expresses, with a value of the control instruction data, control information with an instruction to stand by. FIG. 11 illustrates an example of the data format of a data field including control instruction data.

The fraud determination rule storing unit 360 stores fraud determination rules for frames that the gateway 300a may receive. FIG. 12 illustrates an example of fraud determination rules.

The forwarding processing unit 370 follows forwarding rules stored by the forwarding rule storing unit 380 to decide the bus to forward to according to the ID (message ID) of the received frame, and reports to the frame generating unit 390 bus information indicating the bus to forward to, the message ID and data reported by the frame interpreting unit 320, and the control instruction data reported by the fraud determination processing unit 350. Note that the gateway 300a does not forward an error frame received from one bus to the other buses.

The forwarding rule storing unit 380 stores forwarding rules, which are information expressing rules for forwarding frames for each bus. FIG. 13 is a diagram illustrating an example of forwarding rules.

The frame generating unit 390 constructs an error frame in accordance with a notification of instructions to transmit an error frame from the frame interpreting unit 320, and passes the error frame to the frame transmitting and receiving unit 310 for transmission. In addition, the frame generating unit 390 constructs a frame using the message ID, data, and control instruction data reported by the forwarding processing unit 370, and passes the frame and the bus information to the frame transmitting and receiving unit 310.

1.11 Example Format of Data Field of Frame

FIG. 11 is a diagram illustrating an example of the data field of a transmission frame used for transmission when forwarding a frame.

In the data field of the transmission frame, control instruction data is stored in addition to the data stored in the data field of the frame that the gateway 300a received from the ECU.

As illustrated by example in FIG. 11, the control instruction data in the transmission frame is configured to include a standby flag, an end standby instruction flag, and an end standby instruction existence flag, for example.

The standby flag is the leading bit or the like of the region of the control instruction data, for example, and indicates whether or not it is necessary to stand by in the process corresponding to the data in that frame in the ECU (such as the ECU 100a to 100e that received the frame) after receiving the transmission frame. According to the example of FIG. 11, in the case of instructing the ECU that received the frame to stand by without executing the process corresponding to the data in that frame, the value of the standby flag is set to "1", whereas when standby is not necessary, the value of the standby flag is set to "0". If the value of the standby flag inside the frame is "1", the receiving ECU holds the frame and deters processing after reception until a certain condition (such as being instructed by the end standby flag inside a subsequent frame that standby is canceled, or in other words, that starting execution of the process is allowed, for example) is established. If the value of the standby flag inside the frame is "0", the receiving ECU is able to execute the functional process corresponding to the data in that frame immediately. The default value of the control instruction data added to the transmission frame when forwarding a frame is 0, and the standby flag is in a state indicating that standby is unnecessary, but in certain cases according to the fraud determination process, the gateway 300a sets the standby flag to indicate a standby instruction.

The end standby instruction flag is the trailing bit or the like of the region of the control instruction data, for example, and is a flag indicating the processing method (cancel standby or discard) for the process corresponding to a previously received frame that the ECU was holding and standing by for permission to start executing the process. According to the example of FIG. 11, in the case of indicating to cancel standby (in other words, permission to start executing the process), the value of the end standby instruction flag is set to "1", while in the case of indicating to discard (in other words, to discard the frame without executing the process corresponding to the frame), the value of the end standby instruction flag is set to "0".

The end standby instruction existence flag is one bit or the like between the leading bit and the trailing bit of the region of the control instruction data, for example, and is a flag indicating whether or not the end standby instruction flag is valid. The control instruction data in a frame includes a standby flag related to the standby of the process for that frame, but the end standby instruction flag indicating the processing method (cancel standby or discard) for a preceding frame may be included in some cases, and not included in other cases. According to the example of FIG. 11, in the control instruction data, if a valid end standby instruction flag is included, the value of the end standby instruction existence flag is set to "1", while 9 a valid end standby instruction flag is not included, the value of the end standby instruction existence flag is set to "0".

1.12 Example of Fraud Determination Rules

FIG. 12 illustrates an example of fraud determination rules stored by the fraud determination rule storing unit 360 of the gateway 300a. The fraud determination rules are used to judge whether or not a transmitted frame is appropriate (whether or not a transmitted frame is fraudulent) according to predetermined rules in the vehicle network system 10. In FIG. 12, a subset of the fraud determination rules stored by the fraud determination rule storing unit 360 are illustrated as an example. The example of the fraud determination rules in FIG. 12 indicate the frame transmission periods for each ID (message ID) of respective frames transmitted and received by the buses connected by the gateway 300a. The example of FIG. 12 illustrates that the periods on which the frames having the respective message IDs "1", "2", "3", and "4" are transmitted are 24 ms, 24 ms, 120 ms, and 90 ms, respectively.

In the gateway 300a, a frame is determined to be appropriate or not according to the reception interval between the received frame and the last received frame with the same ID, based on the period as illustrated by example in FIG. 12, and a certain amount of margin (for example, 3 ms). For example, in consideration of the looseness of the reception interval due to arbitration (retransmission control) when collisions between frames occur on a bus, a received frame is determined to be appropriate if the reception interval is within the range of the period plus or minus a certain amount of margin (for example, 3 ms). Additionally, even if the received frame is on a reception interval that is shorter than the range of the margin, the received frame is determined to be appropriate if no frame with the same ID is received within the range of the margin. A frame received on a reception interval shorter than the range of the margin is determined to be fraudulent if a frame with the same ID is received within the range of the margin. Herein, the margin is described as being fixed at the same amount for frames of all IDs, but the amount of margin may also be differentiated on a per-ID basis.

1.13 Forwarding Rules Example

FIG. 13 illustrates an example of forwarding rules stored by the forwarding rule storing unit 380 of the gateway 300a and the like. The forwarding rules prescribed by the forwarding table in FIG. 13 associate a forwarding source bus, a forwarding destination bus, and a forwarding target ID (message ID). The gateway 300a follows the forwarding rules to decide whether or not to forward, which bus to forward to, and so on.

The example in FIG. 13 indicates that frames received from the bus 200a are configured to be forwarded to the bus 200b, regardless of the message ID. The example in FIG. 13 also indicates that, among the frames received from the bus 200b, only the frames having a message ID of "3" are configured to be forwarded to the bus 200a. Note that the example of FIG. 13 also indicates forwarding rules stored by the forwarding rule storing unit 380 of the gateway 300b, in which all frames received from the bus 200b are configured to be forwarded to the bus 200c, but frames received from the bus 200c are configured not to be forwarded to the bus 200b.

1.14 Example Operations Related to Frame Forwarding

Figure 14:
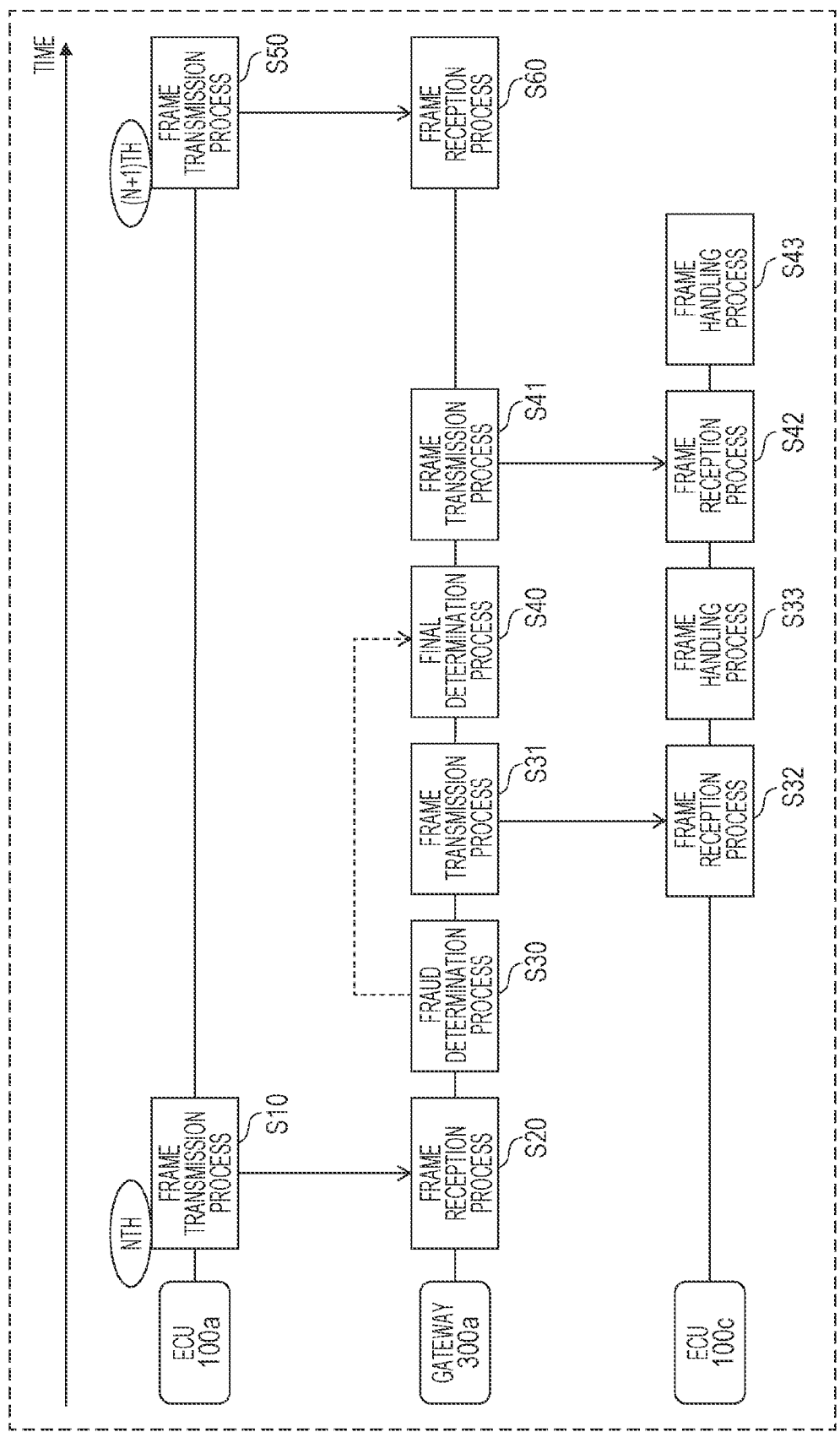
FIG. 14 is a sequence diagram illustrating example operations related to frame forwarding according to Embodiment 1.

FIG. 14 illustrates example operations when the gateway 300a receives a frame transmitted from the ECU 100a to the bus 200b, in which the gateway 300a determines whether the frame is appropriate or fraudulent, and when a certain condition is satisfied, includes, in the frame, control instruction data setting the standby flag with an instruction to standby, and forwards the frame to the bus 200b. The certain condition is a condition that is satisfied in a situation in which a received frame cannot be decided as appropriate or fraudulent when forwarding the frame. Hereinafter, the operations of each device will be summarized by following FIG. 14. Detailed operations of each device will be described later using FIGS. 15 to 19.

First, the ECU 100a executes a frame transmission process to transmit a frame to the bus 200a (step S10).

The gateway 300a receives the frame transmitted from the ECU 100a (step S20).

The gateway 300a conducts a fraud determination process to determine whether the received frame is appropriate or fraudulent, based on the fraud determination rules (step S30). According to the fraud determination process, if an attacker fraudulently accesses the vehicle network (such as the buses 200a to 200c) and transmits a fraudulent frame (a frame not conforming to predetermined rules that frames must follow), for example, it becomes possible to discard such a frame without forwarding. However, in the case of a frame which conforms poorly to the rules that frames must follow, but which has a possibility of being finally determined (decided) to be appropriate, the gateway 300a may not discard the frame immediately, but instead conduct a final determination process for making a final determination after forwarding the frame. If the received frame can be immediately determined to be appropriate or not, the gateway 300a generates a transmission frame including control instruction data in which the standby flag is set to indicate that standby is unnecessary. FIG. 14 illustrates an example in which the certain condition, namely, a situation in which a received frame cannot be immediately determined (decided) to be appropriate or not, is satisfied. When the certain condition is satisfied, in order to report when forwarding the frame that it is undecided whether the frame is appropriate or not, the gateway 300a generates a transmission frame including control instruction data in which the standby flag is set to indicate a standby instruction. Subsequently, the gateway 300a sets a timer so that a final determination process will be executed at a timing when the received frame can be determined finally as appropriate or not.

The gateway 300a transmits, to the bus 200b, the transmission frame including control instruction data in which the standby flag is set to indicate a standby instruction (step S31).

The frame transmitted to the bus 200b by the gateway 300a in step S31 is received by the ECU 100c (step S32).

The ECU 100c checks the standby flag in the control instruction data included in the received frame, deters execution of processing after receiving the frame, holds the frame, and conducts a standby process of waiting for the next instruction (step S33).

The gateway 300a executes the final determination process at a timing when the received frame can be determined finally as appropriate or not, according to the timer set in step S30 (step S40). FIG. 14 illustrates an example in which the frame is determined to be appropriate in the final determination process.

The gateway 300a generates and transmits a frame including control instruction data in which the end standby instruction flag is set according to the determination result from the final determination process, and in addition, the value of the end standby instruction existence flag is set to "1" to indicate that a valid end standby instruction flag is included (step S41). Note that the gateway 300a sets the end standby instruction flag to indicate a cancel standby instruction if the determination result from the final determination process is an appropriate result, and sets the end standby instruction flag to indicate a discard instruction if the determination result is a fraudulent result. In addition, the control instruction data including a valid end standby instruction flag may be stored in a transmission frame when the gateway 300a forwards a separately received frame, or may be stored in a frame that is not forwarded but newly generated. In the case of storing the control instruction data including a valid end standby instruction flag in a transmission frame when the gateway 300a forwards a separately received frame, the standby flag of the that control instruction data is set according to whether or not that separately received frame can be immediately determined as appropriate or not.

The frame transmitted to the bus 200b by the gateway 300a in step S41 is received by the ECU 100c (step S42).

The ECU 100c confirms that the end standby instruction existence flag is "1" in the control instruction data included in the frame received in step S42, checks the end standby instruction flag, and if a cancel standby instruction is indicated, starts execution of the frame already being held by performing a standby process (step S43). From the perspective of the ECU 100c receiving such a cancel standby instruction, the standby instruction received in step S32 was an instruction to delay the start of execution of the process for the frame, and the delayed execution is started after receiving the frame in step S43.

After that, the ECU 100c transmits the next frame to the bus 200a (step S50), and the gateway 300a receives the frame transmitted from the ECU 100a (step S60).

1.15 Frame Transmission Process of ECU 100a

Figure 15:
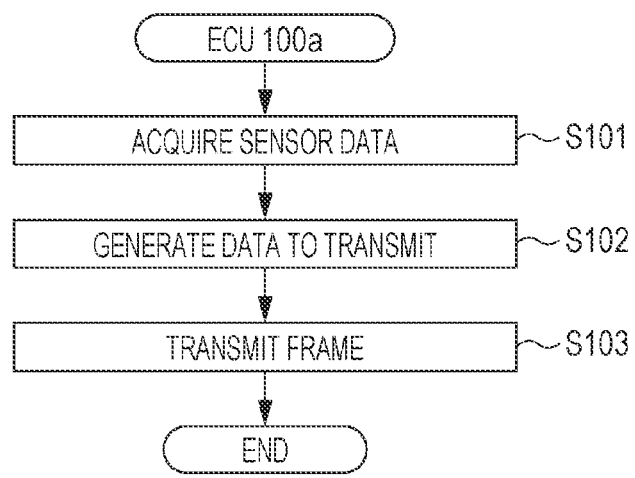
FIG. 15 is a flowchart illustrating an example of a frame transmission process in an ECU according to Embodiment 1.

FIG. 15 is a flowchart illustrating an example of a frame transmission process in the ECU 100a.

The ECU 100a uses the data acquiring unit 170 to acquire sensor data indicating the state of a sensor or the like joined to the ECU 100a, and notifies the frame generating unit 180 (step S101).

The ECU 100a uses the frame generating unit 180 to generate a frame to transmit, based on the acquired sensor data (step S102).

The ECU 100a uses the frame transmitting and receiving unit 110 to transmit the frame generated by the frame generating unit 180 to the bus 200a (step S103). Since frames transmitted on a CAN do not specify a transmission destination, the frame is broadcasted, and each node connected to the bus 200a (such as the gateway 300a) may receive the frame.

1.16 Frame Forwarding Process of Gateway 300a

Figure 16:
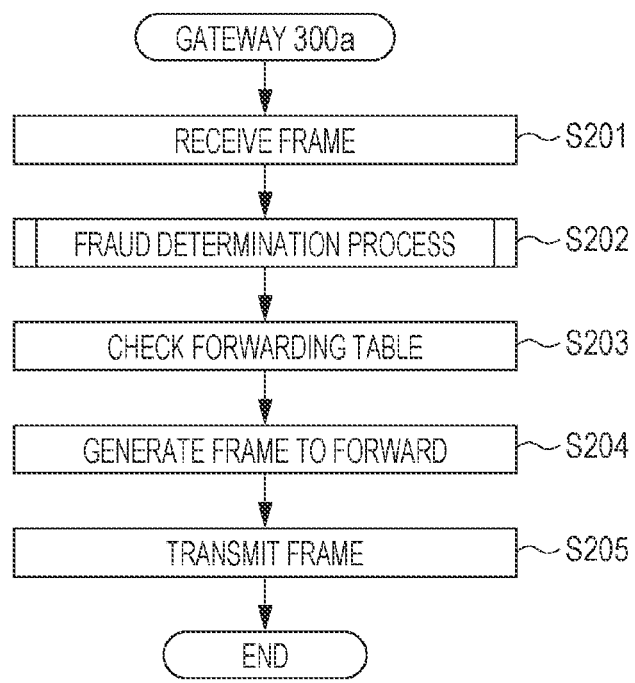
FIG. 16 is a flowchart illustrating an example of a frame forwarding process in a gateway according to Embodiment 1.

FIG. 16 is a flowchart illustrating an example of a frame forwarding process in the gateway 300a, in which a frame received from the bus 200a is forwarded to the bus 200b. Hereinafter, the frame forwarding process of the gateway 300a will be described by following the diagram.

The gateway 300a receives a frame transmitted to the bus 200a (step S201).

The gateway 300a conducts a fraud determination process to determine whether or not the frame received in step S201 is appropriate (step S202). In the fraud determination process (see FIG. 17), a timer is set as necessary, and a final determination process (see FIG. 18) may be executed after step S205 according to the timer.

The gateway 300a checks the forwarding rules prescribed by the forwarding table stored in the forwarding rule storing unit 380 (step S203).

If a forwarding destination bus is prescribed in the forwarding table, the gateway 300a generates a forwarding frame (transmission frame) for forwarding (step S204).

The gateway 300a transmits (broadcasts) the generated transmission frame to the bus 200b (step S205).

1.17 Fraud Determination Process of Gateway 300a

Figure 17:
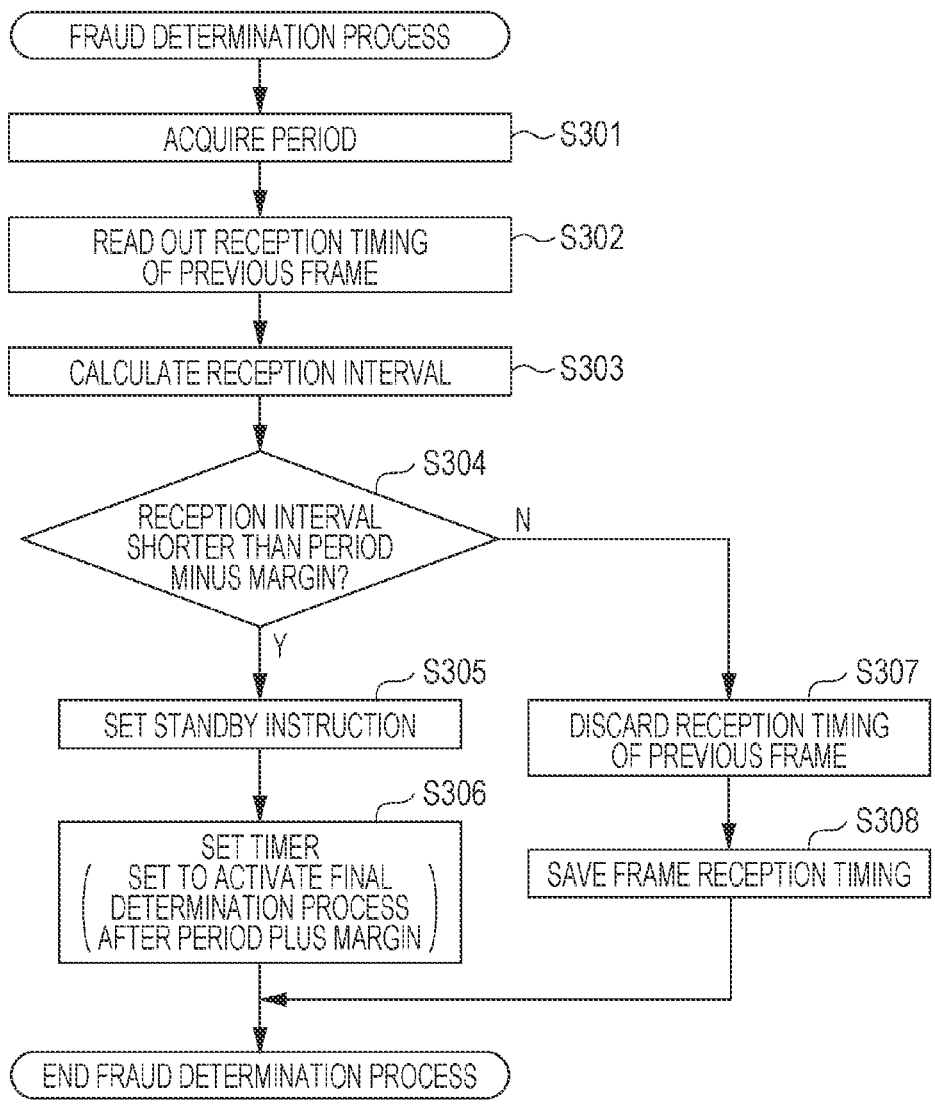
FIG. 17 is a flowchart illustrating an example of a fraud determination process in a gateway according to Embodiment 1.

FIG. 17 is a flowchart illustrating an example of a fraud determination process in the gateway 300a, in which a frame is determined to be appropriate or fraudulent from the transmission interval of received frames. Hereinafter, the fraud determination process of the gateway 300a will be described by following the diagram.

The gateway 300a acquires the period corresponding to the message ID included in the received frame from the fraud determination rules stored by the fraud determination rule storing unit 360 (step S301).

The gateway 300a acquires information about the reception timing of a previously received frame having the same message ID as the received frame (step S302).

The gateway 300a calculates the reception interval between the previously received frame and the currently received frame (step S303).

The gateway 300a determines whether or not the reception interval calculated in step S303 is shorter than the period minus the margin (step S304).

If the reception interval is determined to be shorter than the period minus the margin in step S304, the gateway 300a judges that the frame period is abnormal and that time is needed to decide whether or not the received frame is appropriate. The gateway 300a sets the standby flag to indicate a standby instruction for the control instruction data to be included in the transmission frame for forwarding (step S305). Herein, for the sake of convenience, it is described that when the reception interval is shorter than the period minus the margin, it is judged that more time is needed to decide whether or not the received frame is appropriate. However, for example, in the limited case in which the degree of the reception interval being shorter than the period minus the margin is less than a predetermined fixed degree, it may be judged that time is needed to decide whether or not the received frame is appropriate, whereas if the reception interval diverges from the period by greater than the fixed degree, it may be judged that the frame is fraudulent.

After step S305, the gateway 300a sets a timer to activate a final determination process for later determining whether or not the currently received frame is appropriate based on whether or not another frame with the same ID is received within the range of the normal period determined by the fraud determination rules, plus or minus the margin (step S306). Note that the gateway 300a retains information about the currently received frame to be determined in the final determination process until the activation of the final determination process. In step S306, the timer is set so that the final determination process is activated at a timing obtained by adding the normal period plus the margin to the previous reception timing of a frame having the same message ID as the currently received frame. The final determination process activated by the timer will be described later using FIG. 18.

If the reception interval is determined not to be shorter than the period minus the margin in step S304, the gateway 300a judges that the received frame is appropriate, discards the information about the reception timing of the previously received frame (step S307), and saves information about the reception timing of the currently received frame (step S308). Note that additional conditions for judging that the received frame is appropriate may also be added. Also, in the case of judging that the received frame is appropriate, the gateway 300a keeps the standby flag at the default state indicating that standby is unnecessary for the control instruction data to include in the transmission frame for forwarding.

1.18 Final Determination Process of Gateway 300a

Figure 18:
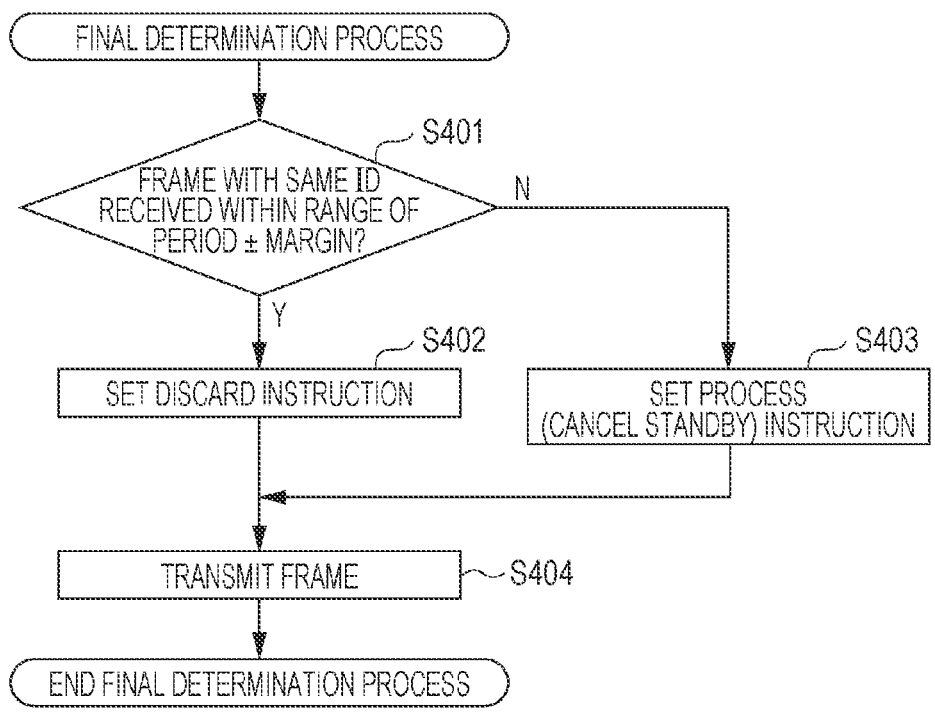
FIG. 18 is a flowchart illustrating an example of a final determination process in a gateway.

FIG. 18 is a flowchart illustrating an example of a final determination process in the gateway 300a, in which a received frame is determined finally to be appropriate or fraudulent. Hereinafter, the final determination process of the gateway 300a will be described by following the diagram.

The gateway 300a checks whether or not another frame with the same ID was received at a reception timing when the elapsed time since the reception timing of the previous frame with the same ID as the frame to be determined by the final determination process is within the range of the normal period plus or minus the margin (step S401). In step S401, 9 it is confirmed that another frame with the same ID was received at a reception timing within the range of the normal period plus or minus the margin, the gateway 300a includes control instruction data indicating a discard instruction in the transmission frame. In other words, in this case, the gateway 300a makes a final determination (decision) that the frame to determine is fraudulent, and sets information instructing the ECU to discard the frame for which the ECU had been deterring processing and standing by in the control instruction data to include in the transmission frame for forwarding (step S402). In step S402, the gateway 300a sets the end standby instruction flag in the control instruction data to indicate a discard instruction, and sets the end standby instruction existence flag to indicate that the end standby instruction flag is valid.

In step S401, if it is confirmed that another frame with the same ID was not received at a reception timing within the range of the normal period plus or minus the margin, the gateway 300a includes control instruction data indicating a cancel standby instruction in the transmission frame. In other words, in this case, the gateway 300a makes a final determination (decision) that the frame to determine is appropriate, and sets information instructing the ECU to start executing the processing (in other words, cancel the standby) for the frame for which the ECU had been deterring processing and standing by in the control instruction data to include in the transmission frame for forwarding (step S403). In step S403, the gateway 300a sets the end standby instruction flag in the control instruction data to indicate a cancel standby instruction, and sets the end standby instruction existence flag to indicate that the end standby instruction flag is valid. At this point, although omitted in FIG. 18, the gateway 300a may discard the information about the reception timing of the previous frame and save the reception timing of the frame that was determined (steps S307, S308).

After step S402 or step S403, the gateway 300a transmits (broadcasts) a frame set with the same message ID as the frame to be determined and including control instruction data in the data field to the bus 200a (step S404).

1.19 Frame Reception Process of ECU 100c

Figure 19:
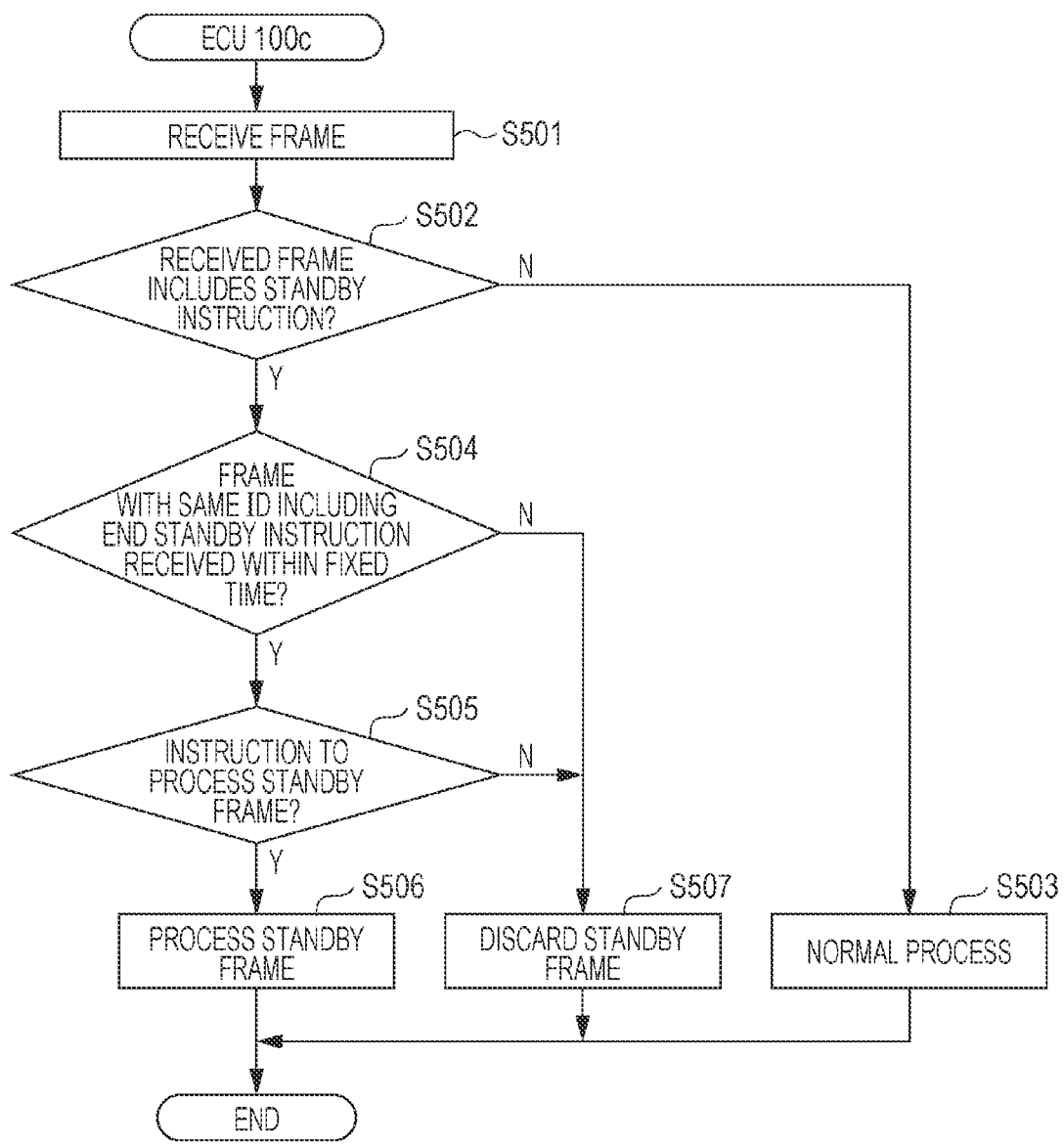
FIG. 19 is a flowchart illustrating an example of a frame reception process in an ECU according to Embodiment 1.

FIG. 19 is a flowchart illustrating an example of a frame reception process in the ECU 100c. Hereinafter, the frame reception process of the ECU 100c will be described by following the diagram.

The ECU 100c receives a frame transmitted to the bus 200b (step S501).

The ECU 100c checks the control instruction data in the data field of the received frame, and determines whether or not a standby instruction is included (step S502). If the standby flag in the control instruction data has a value of "1" indicating a standby instruction, it is determined that a standby instruction is included. If a standby instruction is not included (in other words, if the standby flag indicates that standby is unnecessary), the ECU 100c executes a process corresponding to the received frame (such as a functional process corresponding to data in the frame) (step S503). The execution of the process in step S503 is started rapidly after receiving the frame.

In step S502, if it is determined that a standby instruction is included, the ECU 100c holds the frame received in step S501, and without starting the execution of a functional process for that frame, wats for a fixed time to receive a subsequent end standby instruction (step S504). In other words, in step S504, the ECU 100c stands by to receive a frame having the same ID as the frame received in step S501, and including an end standby instruction existence flag in the control instruction data that indicates a valid end standby instruction flag. The fixed time is an amount of time sufficient for the end standby instruction to be transmitted. If an end standby instruction is not received after the fixed time elapses, the ECU 100c cancels the standby for the held frame, and discards the frame (step S507).

In step S504, if a frame including a valid end standby instruction flag as control instruction data and having the same ID is received, the ECU 100c Judges whether or not the end standby instruction flag is an instruction to cancel standby (step S505). In other words, the ECU 100c judges whether or not the control instruction data indicates an instruction to start execution of the processing of the frame for which process execution is on standby.

In step S505, in the case of judging that an instruction to cancel standby is indicated, the ECU 100c cancels the standby state for the frame for which process execution is on standby, and starts execution of a functional process corresponding to the frame (step S506). Meanwhile, in step S505, in the case of Judging that an instruction not to cancel standby but instead to discard is indicated (the case of Judging that the end standby instruction flag is a discard instruction), the ECU 100c discards the frame on standby (step S507).

1.20 Advantageous Effects of Embodiment 1

In the vehicle network system 10 according to Embodiment 1, the gateway 300a conducts frame transmission in which control instruction data is set in the data field of a frame (data frame), and thereby controls the processing of a frame received at an ECU. The gateway 300a may include, in the control instruction data, control information that restricts processing in the ECU that receives the frame (for example, a standby flag set to indicate a standby instruction). In this way, when forwarding a received frame, by having the gateway 300a transmit a transmission frame in which control instruction data is set to express a standby instruction, it becomes possible to secure enough time for a determination process to determine whether or not the received frame is appropriate. Additionally, if there is possibility that the received frame may be determined finally as appropriate, the forwarding of the frame is not stopped, but instead frame forwarding is conducted with a standby instruction attached, thereby preventing the receiving ECU from executing an abnormal process or the like due to the frame not arriving. In other words, by using the control instruction data added to a frame during forwarding, the ECU that receives the frame becomes able to distinguish that the current state is not one in which a regular ECU that transmits a frame has malfunctioned and the frame will not arrive. Also, by having the gateway 300a determine whether a frame is appropriate or fraudulent, it is not necessary for the individual ECUs 100a to 100e to include such a determination function, thereby making it possible to reduce costs for the system as a whole, and simplify operations such as updating fraud determination rules.

Embodiment 2

Hereinafter, a vehicle network system 20, which is a partial modification of the vehicle network system 10 indicated in Embodiment 1, will be described.

In the vehicle network system 20 according to the present embodiment, frames including data and a checksum in the data field are transmitted and received over the vehicle network. Additionally, the gateway device that forwards a frame between buses does not add control instruction data to the frame, but instead incorporates control information into the checksum as necessary. The information incorporated into the checksum by the gateway device (gateway 1300a, 1300b) in the present embodiment is, for example, a standby instruction according to a standby flag, a cancel standby instruction according to an end standby instruction flag, and a discard instruction according to an end standby instruction flag in the control instruction data indicated in Embodiment 1. Additionally, in the vehicle network system 20, the gateway device makes the final determination of whether or not a received frame is appropriate by communicating with a server 400 that is external to the vehicle.

2.1 Overall Configuration of Vehicle Network System 20

Figure 20:
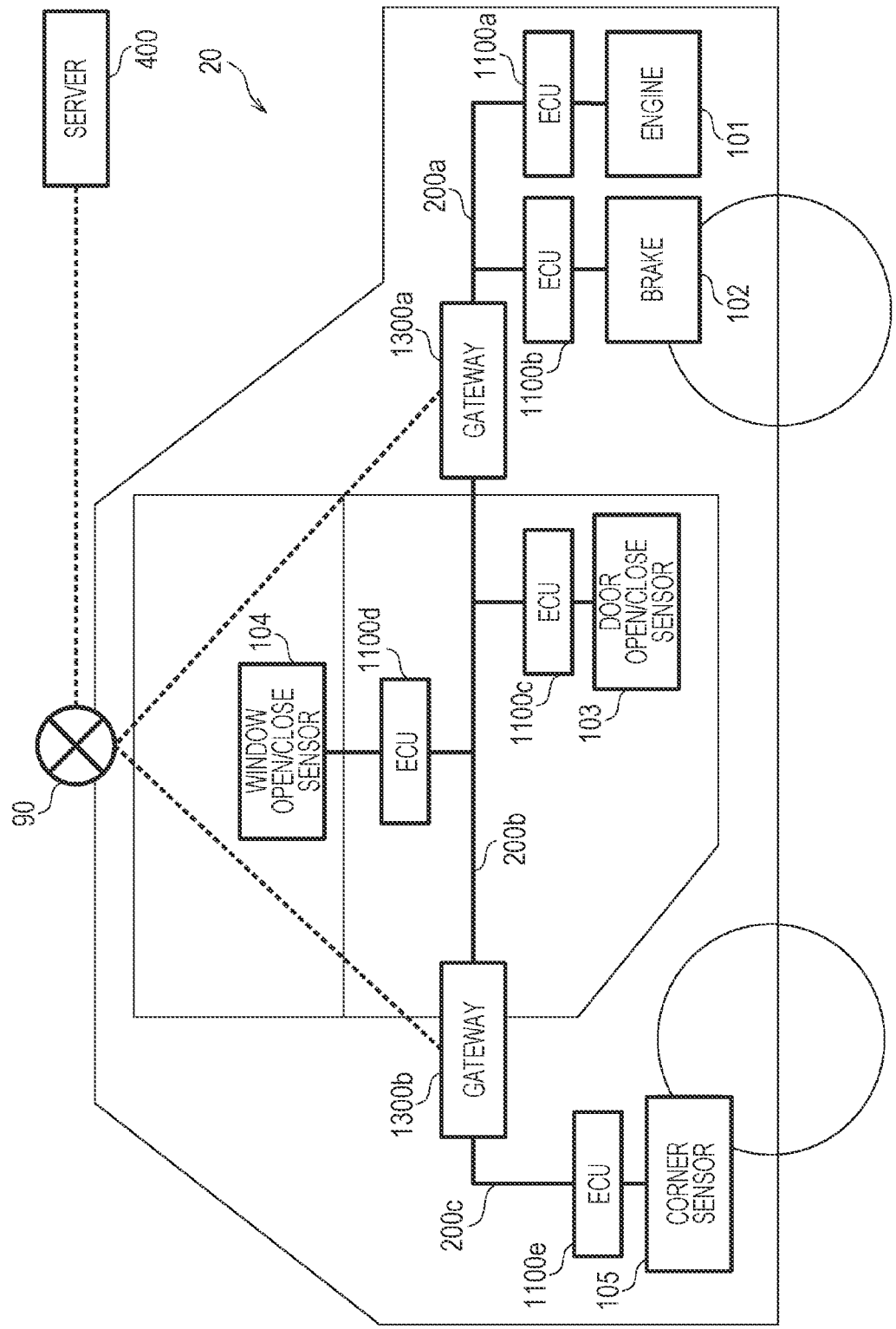
FIG. 20 is a diagram illustrating an overall configuration of a vehicle network system according to Embodiment 2.

FIG. 20 is a diagram illustrating an overall configuration of the vehicle network system 20 according to Embodiment 2. The vehicle network system 20 is configured to include buses 200a, 200b, and 200c, respective nodes connected to the buses, such as gateways 1300*a* and 1300*b*, and ECUs such as ECUs 1100*a* to 1100*e* connected to various types of equipment, and also a network 90 and a server 400 which are external to the vehicle.

The vehicle network system 20 is obtained by replacing the gateways 300*a* and 300*b* as well as the ECUs 100*a* to 100*e* in the vehicle network system 10 indicated in Embodiment 1 (see FIG. 1) with the gateways 1300*a* and 1300*b* as well as the ECUs 1100*a* to 1100*e*, and also adding the server 400 and the network 90. Structural elements that are the same as Embodiment 1 are denoted with the same signs in FIG. 20, and the description thereof will be reduced or omitted. Regarding points not described herein, the vehicle network system 20 is similar to the vehicle network system 10.

Each of the ECUs 1100*a* to 1100*e* is connected to one of the buses, and is connected to an engine 101, a brake 102, a door open/close sensor 103, a window open/close sensor 104, and a corner sensor 105, respectively. The ECUs 1100*a* to 1100*e* include functions basically similar to the ECUs 100*a* to 100*e* indicated in Embodiment 1, with the addition of a function for handling a checksum included in a frame. Each of the ECUs 1100*a* to 1100*e* acquires the state of the connected equipment, and periodically transmits information such as a frame including data expressing the state, the ID, the DLC, and a checksum calculated from the data, on the network (that is, a bus). In addition, each of the ECUs 1100*a* to 1100*e* checks the checksum in a received frame, extracts control information incorporated into the checksum, and performs control related to operations such as whether to execute a functional process according to the data in the received frame, or stand by.

The gateways 1300*a* and 1300*b* are gateway devices that connect multiple different communication pathways, and forward data between communication pathways. The gateway 1300*a* connects the bus 200*a* joining the ECU 1100*a* and the ECU 1100*b* to the bus 200*b* joining the ECU 1100*c* and the ECU 1100*d*. Also, the gateway 1300*b* connects the bus 200*b* Joining the ECU 1100*c* and the ECU 1100*d* to the bus 200*c* Joining the ECU 1100*e*.

The gateways 1300*a* and 1300*b* include a function of performing a conditional determination related to whether a frame received from one bus is appropriate or fraudulent, incorporating a standby instruction into the checksum inside the frame as necessary, and forwarding the frame to another bus. The forwarding of a frame in the gateways 1300*a* and 1300*b* is realized by generating a transmission frame including information based on the content of the frame received from one bus, including, in the checksum inside the data field of the transmission frame, information related to a restriction on processing after receiving the transmission frame in an ECU (for example, a standby instruction) as necessary, and transmitting the transmission frame to another bus. Also, the gateways 1300*a* and 1300*b* have a function of communicating with the server 400 external to the vehicle over the network 90 to transmit information about a frame received from a bus, and receive a determination result of whether a frame is appropriate or fraudulent. Additionally, the gateways 1300*a* and 1300*b* may also toggle whether or not to forward a received frame for each bus-to-bus connection. The gateways 1300*a* and 1300*b* are also a type of ECU.

The server 400 is a computer that communicates with the gateways 1300*a* and 1300*b* over the network 90, and acquires and stores information about frames transmitted on the vehicle network. The server 400 may acquire, store, and manage information related to frames received on a bus from the gateway 1300*a* or the like, on a period such as once per day, for example. The server 400 has a function of using the stored information as a basis for determining whether a frame to be determined, about which information is transmitted from the gateway 1300*a* or 1300*b*, is appropriate or fraudulent, and reporting the determination result to the gateway 1300*a* or 1300*b*. For communication over the network 90, any wired or wireless communication protocol may be applied.

2.2 Example Format of Data Field of Frame

Figure 21:
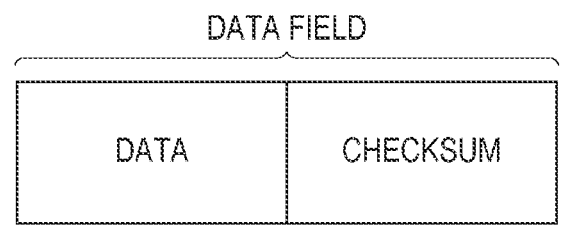
FIG. 21 is a diagram illustrating an example of a data field format of a frame transmitted by a gateway and an ECU according to Embodiment 2.

FIG. 21 is a diagram illustrating an example of the format of a data field in a frame transmitted by the ECUs 1100*a* to 1100*e*. Frames in this format may also be transmitted by the forwarding gateways 1300*a* and 1300*b*.

The data field includes data indicating the values of sensor data, and a checksum calculated from the ID, the DLC, and the data. Note that it is not necessary to use all of the ID, the DLC, and the data to calculate the checksum, and an arbitrary combination or the like may be used. The checksum is verification information reflecting the content of part of the frame, in order to confirm that the content of part of the frame, namely the values of the ID, the DLC, or the data, have not changed partway through transmission. The checksum is set in the transmitting ECU so as to take a value reflecting the content of at least part of the frame, and the ECU that receives the frame verifies the checksum based on the content of that part of the frame.

2.3 Example of Calculating Checksum

Figure 22:
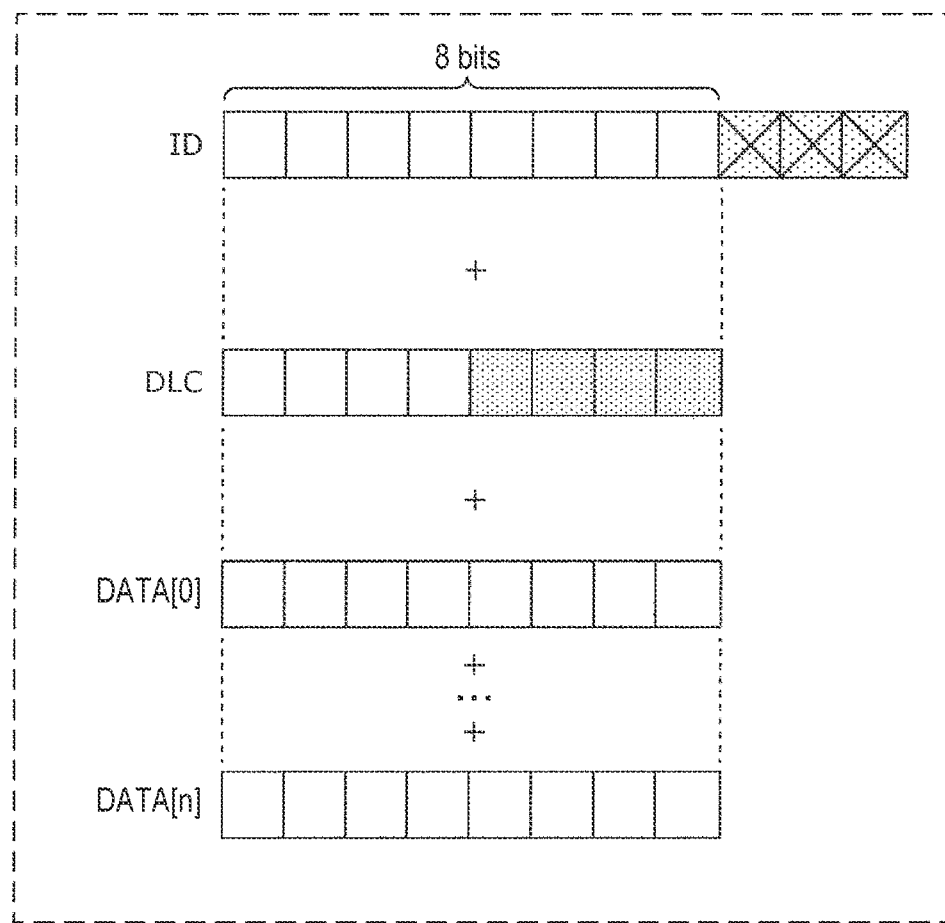
FIG. 22 is a diagram illustrating an example of information used in the calculation of a checksum according to Embodiment 2.

FIG. 22 is a diagram illustrating an example of information used to calculate a checksum.

For example, as illustrated in FIG. 22, the ECUs 1100*a* to 1100*e* calculate a checksum by adding together the most significant 8 bits from the 11-bit ID of the frame (message ID), the 4-bit DLC, and an amount of data equal to the DLC split into chunks of 8 bits (1 byte). In this example, the checksum is 8 bits, and to calculate the checksum, only the most significant bits of the ID are extracted to yield 8 bits, while the remaining bits are removed. Also, to make the DLC 8 bits long, bit values of "0" are used to pad the remaining 4 bits (least significant 4 bits). The checksum is then calculated by adding together the ID, the DLC, and 8-bit chunks of the data which have all been fitted to be 8 bits long.

When forwarding, the gateways 1300*a* and 1300*b* incorporate various control information into the checksum as necessary, the control information corresponding to each of the standby instruction according to the standby flag, the cancel standby instruction according to the end standby instruction flag, and the discard instruction according to the end standby instruction flag in the control instruction data set by the gateways 300*a* and 300*b* indicated in Embodiment 1. As a specific example, among the least significant 4 bits in the padding portion of the DLC, the leading bit is set to a bit value of "1" in the case of the standby instruction, the next bit is set to a bit value of "1" in the case of the cancel standby instruction, while the next bit is set to a bit value of "1" in the case of the discard instruction, and then the checksum is calculated. In cases in which the gateway 1300*a* or 1300*b* is unable to complete a final determination (decision) about whether a received frame is appropriate or fraudulent while receiving, the gateway 1300*a* or 1300*b* conducts frame forwarding by incorporating control information indicating the standby instruction into the checksum of the frame, and transmitting the frame. Additionally, when the gateway 1300a or 1300b completes the final determination (decision) about whether the frame is appropriate or fraudulent after issuing the standby instruction for the frame, the gateway 1300a or 1300b transmits a frame into which control information indicating the cancel standby instruction if the frame is appropriate, or the discard instruction if the frame is fraudulent, is incorporated into the checksum.

2.4 Configuration of ECU 1100a

The ECU 1100a has a configuration that is basically similar to the ECU 100a (see FIG. 3). However, in the ECU 1100a, the frame generating unit 180 adds a checksum to a generated frame. Additionally, the frame processing unit 150 checks the checksum inside a frame, extracts control information such as the standby instruction, the cancel standby instruction, or the discard instruction if such control information is present, and according to the control information, deters processing and keeps the frame on standby, cancels standby and starts the execution of processing for a frame that had been on standby, or discards a frame that had been on standby.

2.5 Configuration of Gateway 1300a

Figure 23:
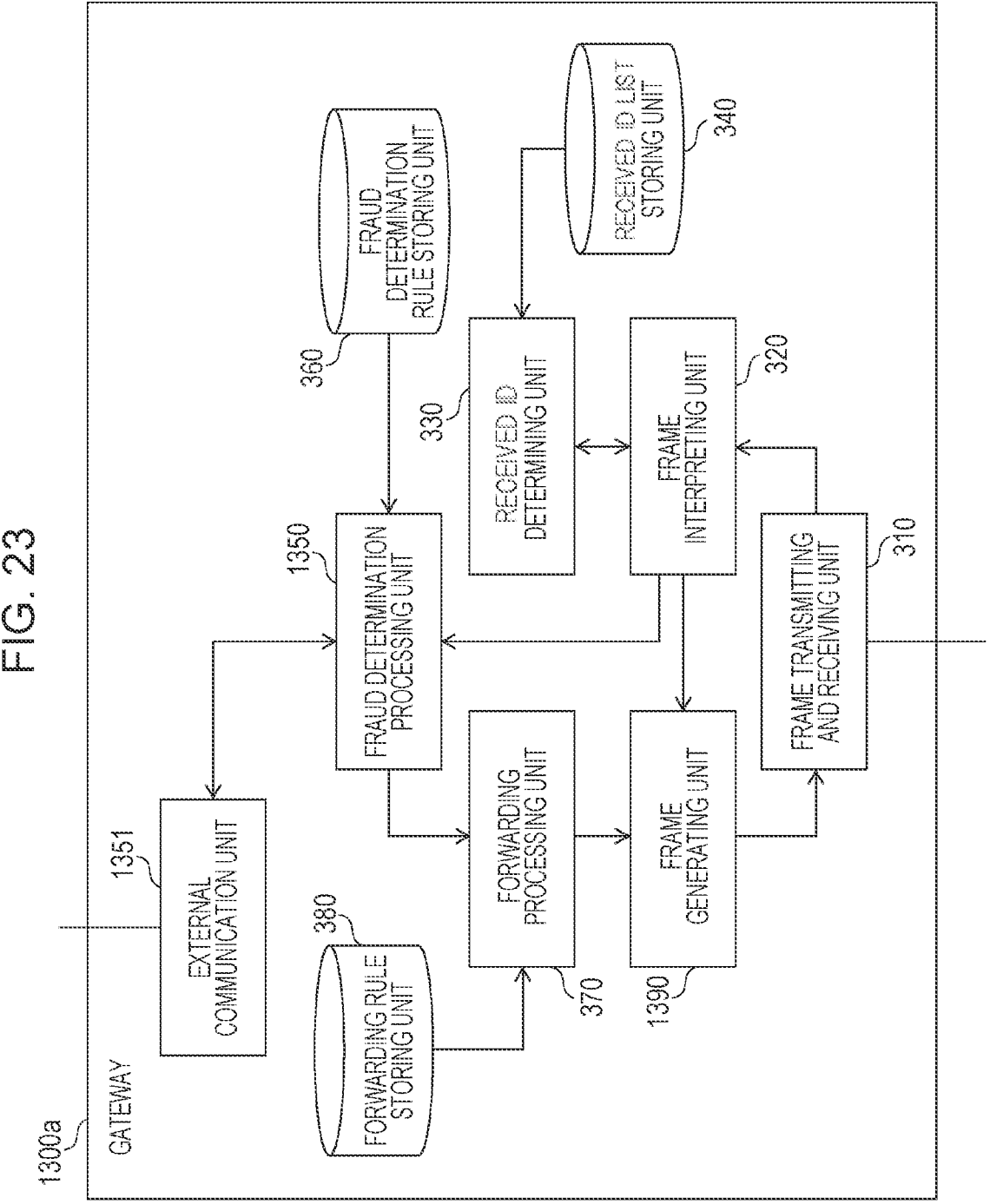
FIG. 23 is a configuration diagram of a gateway according to Embodiment 2.

FIG. 23 is a configuration diagram of the gateway 1300a. The gateway 1300a is configured to include a frame transmitting and receiving unit 310, a frame interpreting unit 320, a received ID determining unit 330, a received ID list storing unit 340, a fraud determination processing unit 1350, an external communication unit 1351, a fraud determination rule storing unit 360, a forwarding processing unit 370, a forwarding rule storing unit 380, and a frame generating unit 1390. The respective functions of these structural elements are realized by components in the gateway 1300a, such as a communication circuit, a processor that executes a control program stored in memory, or a digital circuit. Note that the gateway 1300b likewise is equipped with a configuration basically similar to the gateway 1300a. Note that, among the structural elements of the gateway 1300a, structural elements which are the same as the gateway 300a indicated in Embodiment 1 (see FIG. 10) are denoted with the same signs in FIG. 23, and the description thereof will be reduced or omitted.

The fraud determination processing unit 1350 receives the value of the ID field reported by the frame interpreting unit 320, and conducts a fraud determination process related to whether the received frame is fraudulent or appropriate, based on fraud determination rules stored in the fraud determination rule storing unit 360 (information associating message IDs with periods on which frames are transmitted). In the fraud determination process, when a frame is received, it is judged whether or not it is possible to decide whether or not the frame is appropriate, and according to the judgment result, it is selected whether or not to incorporate control information indicating a standby instruction into the checksum of the frame to forward. The selection result is reported to the forwarding processing unit 370. The selection result is similar to the standby flag in the control instruction data indicated in Embodiment 1, for example. If the fraud determination processing unit 1350 is unable to decide whether a frame is appropriate or fraudulent rapidly when receiving the frame, the fraud determination processing unit 1350 reports the selection result to the forwarding processing unit 370 so that control information indicating an instruction to stand by will be incorporated into the checksum. The selection result is transmitted to the frame generating unit 1390 through the forwarding processing unit 370, and used in the calculation of the checksum to include in the frame to generate. Note that if the fraud determination processing unit 1350 is unable to decide whether a frame is appropriate or fraudulent rapidly when receiving the frame, the fraud determination processing unit 1350 reports information such as the message ID of the received frame, the content of the data field, and the reception timing (time) to the server 400 through the external communication unit 1351, and thereby requests a final determination regarding the received frame. In the server 400 that receives the request, it is determined (decided) whether the frame in question is appropriate or fraudulent, and the determination result is reported to the fraud determination processing unit 1350 through the external communication unit 1351 of the gateway 1300a. The case in which it is not possible to determine whether or not a frame is appropriate rapidly when receiving the frame is the case in which the reception interval of the frame is shorter than the period minus the margin, similarly to the fraud determination processing unit 350 indicated in Embodiment 1. Note that in the limited case in which the degree of the reception interval being shorter than the period minus the margin is less than a predetermined fixed degree, the fraud determination processing unit 1350 may Judge that it is not possible to decide whether or not the received frame is appropriate rapidly when receiving the frame, whereas if the reception interval diverges from the period by greater than the fixed degree, the fraud determination processing unit 1350 may Judge that the frame is fraudulent. According to a determination result from the server 400, the fraud determination processing unit 1350 causes the frame generating unit 1390 to generate a frame through the forwarding processing unit 370, and performs control so that the frame is transmitted to the bus that previously transmitted the frame including control information indicating an instruction to stand by. In other words, the fraud determination processing unit 1350 incorporates, into the checksum, control information indicating an instruction to discard the frame if the frame is determined to be fraudulent by the server 400, or control information indicating an instruction to cancel standby if the frame is determined to appropriate, and performs control so that a frame with the control information incorporated into the checksum is transmitted.

The external communication unit 1351 requests (demands) a determination by transmitting data to the server 400 in accordance with data reported by the fraud determination processing unit 1350. Additionally, the external communication unit 1351 reports a determination result reported by the server 400 to the fraud determination processing unit 1350. In other words, the external communication unit 1351 transmits a demand for a determination (decision) regarding whether or not a frame is appropriate to a device external to the vehicle in which the local device (the gateway 1300a) is installed on-board, and later receives the result of that determination (determination result).

The frame generating unit 1390 constructs an error frame in accordance with a notification of instructions to transmit an error frame from the frame interpreting unit 320, and passes the error frame to the frame transmitting and receiving unit 310 for transmission. In addition, the frame generating unit 1390 calculates a checksum and constructs a frame by using the message ID, data, and control instruction data (an specification of control information indicating an instruction to stand by, cancel standby, or discard) reported by the forwarding processing unit 370, and passes the frame and the bus information to the frame transmitting and receiving unit 310.

2.6 Configuration of Server 400

Figure 24:
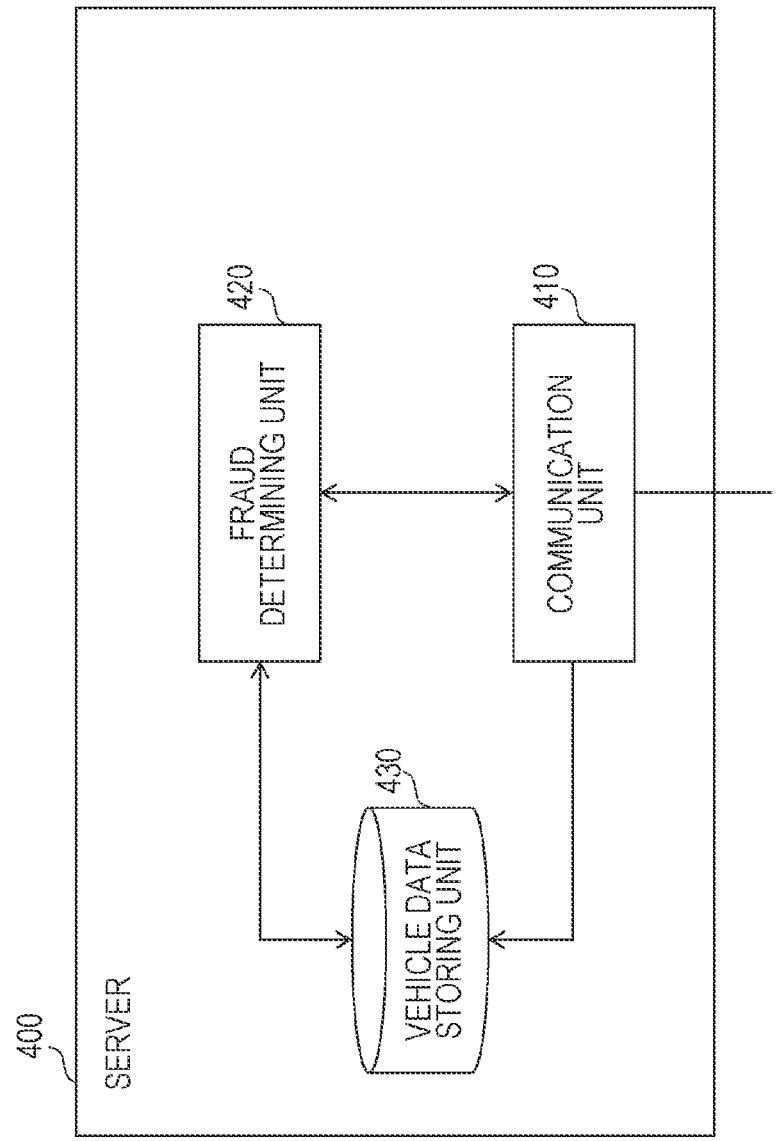
FIG. 24 is a configuration diagram of a server.

FIG. 24 is a configuration diagram of the server 400. The server 400 is configured to include a communication unit 410, a fraud determining unit 420, and a vehicle data storing unit 430.

The communication unit 410 communicates with the gateways 1300a and 1300b over the network 90. Additionally, the communication unit 410 passes information about frames transmitted on the vehicle network reported by the gateways 1300a and 1300b to the vehicle data storing unit 430. Additionally, the communication unit 410 passes reported content received from the fraud determining unit 420 to the gateways 1300a and 1300b.

When the server 400 is requested to make a final determination about whether or a frame is appropriate by the gateway 1300a or the like, the fraud determining unit 420 determines whether the frame in question is appropriate or fraudulent, based on information received through the communication unit 410, and previously acquired information related to frames transmitted on the vehicle network stored in the vehicle data storing unit 430. The fraud determining unit 420 reports the determination result to the communication unit 410.

The vehicle data storing unit 430 includes a function of storing vehicle data, which is information about frames transmitted on a vehicle network.

2.7 Example of Vehicle Data

Figures 25, 26:
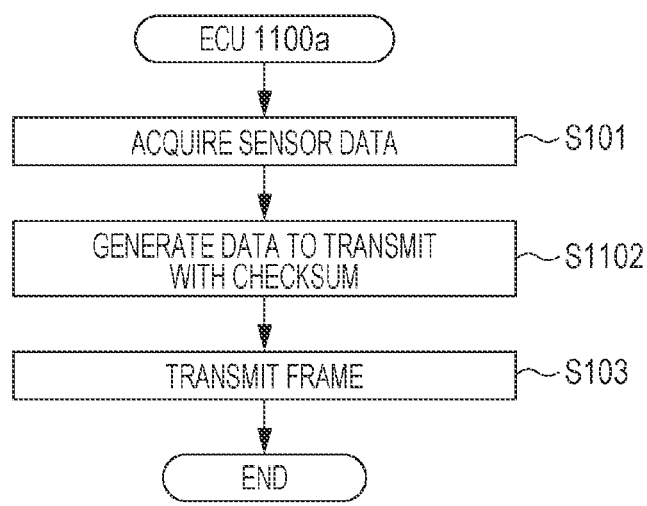
FIG. 25 is a diagram illustrating an example of vehicle data stored by a server.
FIG. 26 is a flowchart illustrating an example of a frame transmission process in an ECU according to Embodiment 2.

FIG. 25 is a diagram illustrating an example of vehicle data stored by the server 400.

The diagram illustrates an example of recording, as the vehicle data, an abnormal period occurrence count thus far for each message ID of frames transmitted by the ECUs installed on-board a specific vehicle. Since the server 400 receives information such as the reception times of frames transmitted on the vehicle network from the gateways 1300a and 1300b, the server 400 stores this information, and continuously analyzes the periods of the frames to record a count of the number of times an abnormal period occurs, for example. The vehicle data illustrated as an example in the diagram indicates information for one vehicle, but the server 400 may store information about each of multiple vehicles.

2.8 Frame Transmission Process of ECU 1100a

FIG. 26 is a flowchart illustrating an example of a frame transmission process in the ECU 1100a. In the diagram, steps which are the same as the frame transmission process of the ECU 100a indicated in Embodiment 1 (see FIG. 15) are denoted with the same signs, and the description thereof will be reduced or omitted as appropriate herein.

The ECU 1100a uses the frame generating unit 180 to include a checksum after the data in the data field, and generates a frame to transmit, based on the sensor data acquired in step S101 (step S1102). The ECU 1100a calculates the checksum from the information illustrated in FIG. 22. Subsequently, in step S103, the ECU 1100a transmits the generated frame to the bus 200a.

2.9 Frame Forwarding Process of Gateway 1300a

Figure 27:
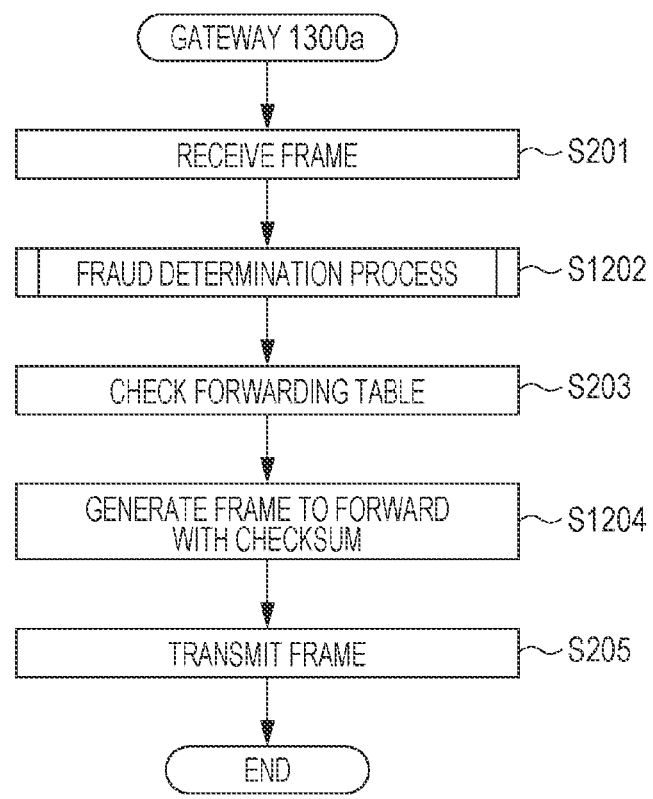
FIG. 27 is a flowchart illustrating an example of a frame forwarding process in a gateway according to Embodiment 2.

FIG. 27 is a flowchart illustrating an example of a frame forwarding process in the gateway 1300a, in which a frame received from the bus 200a is forwarded to the bus 200b. In the diagram, steps which are the same as the frame forwarding process of the gateway 300a indicated in Embodiment 1 (see FIG. 16) are denoted with the same signs, and the description thereof will be reduced or omitted as appropriate herein.

The gateway 1300a conducts a fraud determination process to determine whether or not the frame received from the bus 200a in step S201 is appropriate (step S1202). In the fraud determination process, the gateway 1300a requests the server 400 for a determination as necessary. The fraud determination process will be described later using FIG. 28.

If a forwarding destination bus is prescribed in the forwarding table that prescribes the forwarding rules, the gateway 1300a generates a forwarding frame (a transmission frame including a checksum) for forwarding (step S1204). When generating the transmission frame including a checksum, in the limited case in which the gateway 1300a is unable to decide whether or not the frame is appropriate rapidly when receiving the frame based on the result of the fraud determination process in step S1202, the gateway 1300a incorporates, into the checksum, control information indicating an instruction to stand by, whereas in other cases, the gateway 1300a calculates the checksum from the information illustrated in FIG. 22. Subsequently, in step S205, the gateway 1300a transmits (broadcasts) the transmission frame with included checksum to the bus 200b.

2.10 Fraud Determination Process of Gateway 1300a

Figure 28:
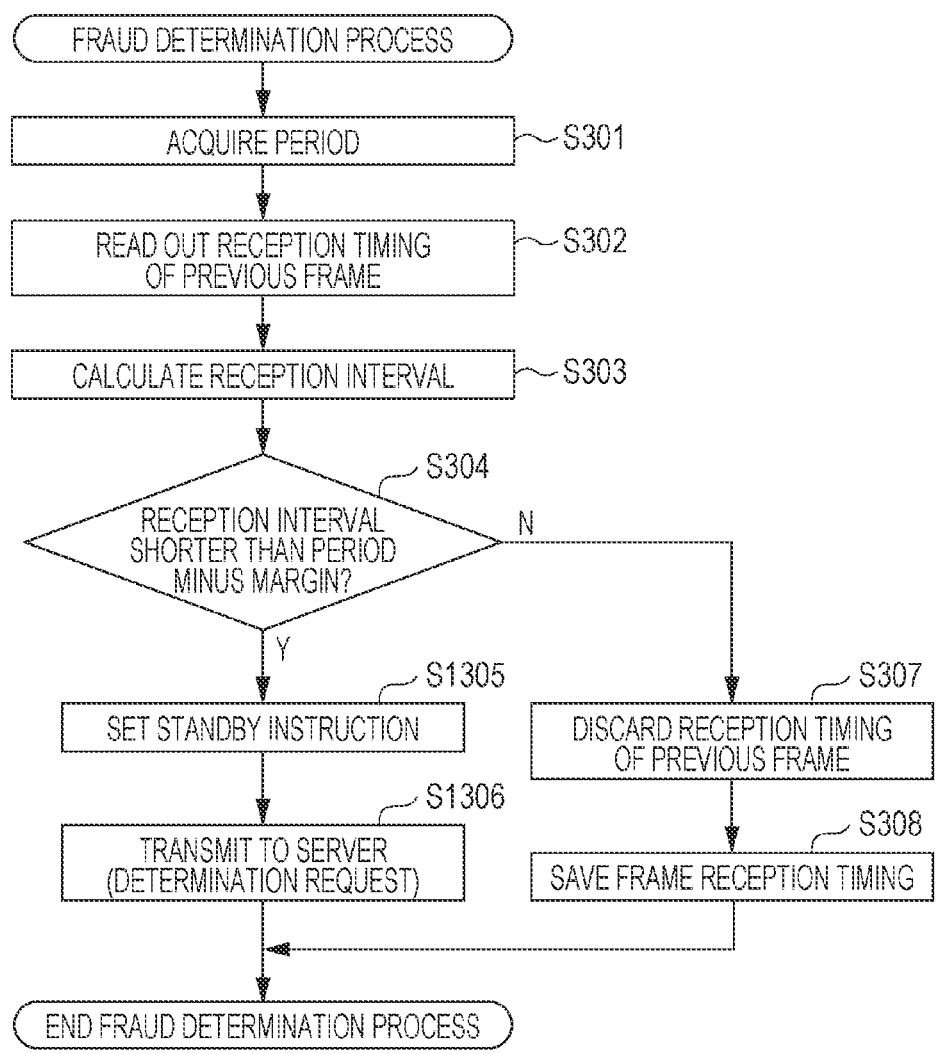
FIG. 28 is a flowchart illustrating an example of a fraud determination process in a gateway according to Embodiment 2.

FIG. 28 is a flowchart illustrating an example of a fraud determination process in the gateway 1300a, in which a frame is determined to be appropriate or fraudulent from the transmission interval of received frames. In the diagram, steps which are the same as the fraud determination process of the gateway 300a indicated in Embodiment 1 (see FIG. 17) are denoted with the same signs, and the description thereof will be reduced or omitted as appropriate herein.

If the reception interval is determined to be shorter than the period minus the margin in step S304, the gateway 1300a judges that the frame period is abnormal and that time is needed to decide whether or not the received frame is appropriate, and configures control information indicating a standby instruction to be incorporated into the checksum to include in the transmission frame (step S1305). For example, the gateway 1300a configures the standby flag of the control instruction data to indicate a standby instruction, and transmits the control instruction data to the frame generating unit 1390 through the forwarding processing unit 370. Subsequently, the frame generating unit 1390 incorporates control information indicating a standby instruction into the checksum, based on the control instruction data.

After step S1305, the gateway 1300a reports information such as the message ID of the received frame, the content of the data field, and the reception timing (time) to the server 400, and thereby requests a final determination regarding the received frame (step S1306). In the case of requesting the server 400 for a determination, the gateway 1300a conducts a server determination handling process for later obtaining a determination result from the server 400.

2.11 Server Determination Handling Process of Gateway 1300a

Figure 29:
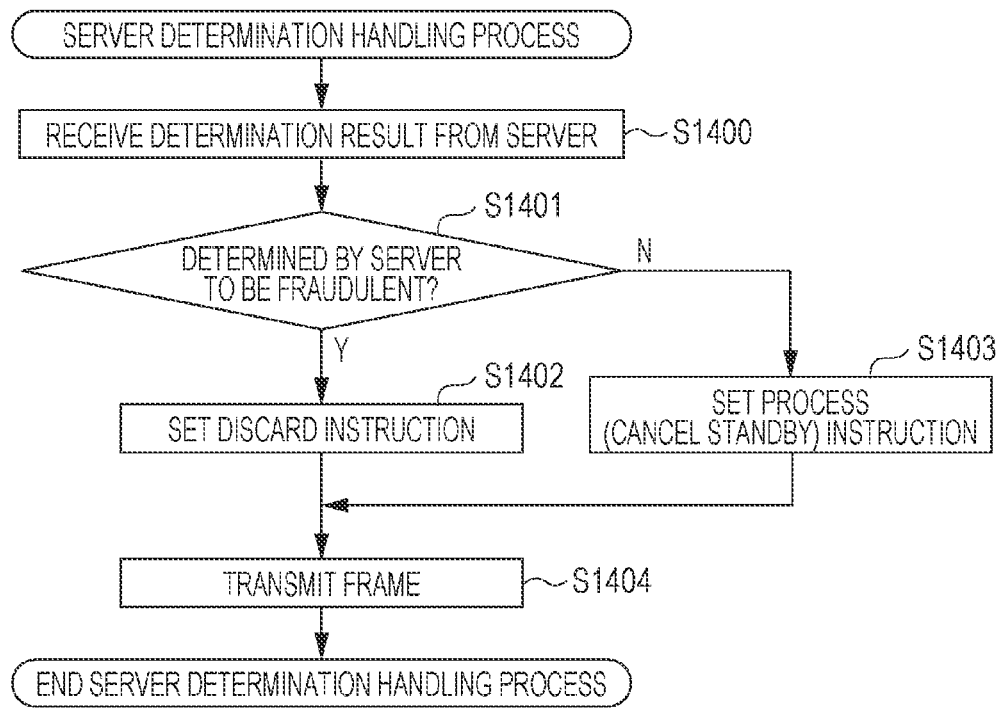
FIG. 29 is a flowchart illustrating an example of a server determination handling process in a gateway according to Embodiment 2.

FIG. 29 is a flowchart illustrating an example of a server determination handling process conducted after the gateway 1300a requests the server 400 for a determination. Hereinafter, the server determination handling process of the gateway 1300a will be described by following the diagram.

The gateway 1300a receives a determination result from the server 400 (step S1400).

If the determination result of the server 400 indicates that the frame in question is fraudulent (step S1401), the gateway 1300a configures control information indicating a discard instruction to be incorporated into the checksum (step S1402). For example, the gateway 1300a configures the end standby instruction flag of the control instruction data to indicate a discard instruction, and transmits the control instruction data to the frame generating unit 1390 through the forwarding processing unit 370. Subsequently, the frame generating unit 1390 incorporates control information indicating a discard instruction into the checksum, based on the control instruction data.

If the determination result of the server 400 indicates that the frame in question is not fraudulent (is appropriate) (step S1401), the gateway 1300a configures control information indicating a cancel standby instruction (in other words, an instruction to start the execution of a functional process corresponding to the frame) to be incorporated into the checksum (step S1403). For example, the gateway 1300a configures the end standby instruction flag of the control instruction data to indicate a cancel standby instruction, and transmits the control instruction data to the frame generating unit 1390 through the forwarding processing unit 370. Subsequently, the frame generating unit 1390 incorporates control information indicating a cancel standby instruction into the checksum, based on the control instruction data. Although omitted in FIG. 29, the gateway 1300a may discard the information about the reception timing of the previous frame and save the reception timing of the frame that was determined (steps S307, S308).

After step S1402 or step S1403, the gateway 1300a transmits (broadcasts) to the bus 200a a frame set with the same message ID as the frame to be determined and including, in the data field, a checksum with incorporated control information indicating a cancel standby or a discard instruction (step S1404).

2.12 Example Operations of Server 400

Figure 30:
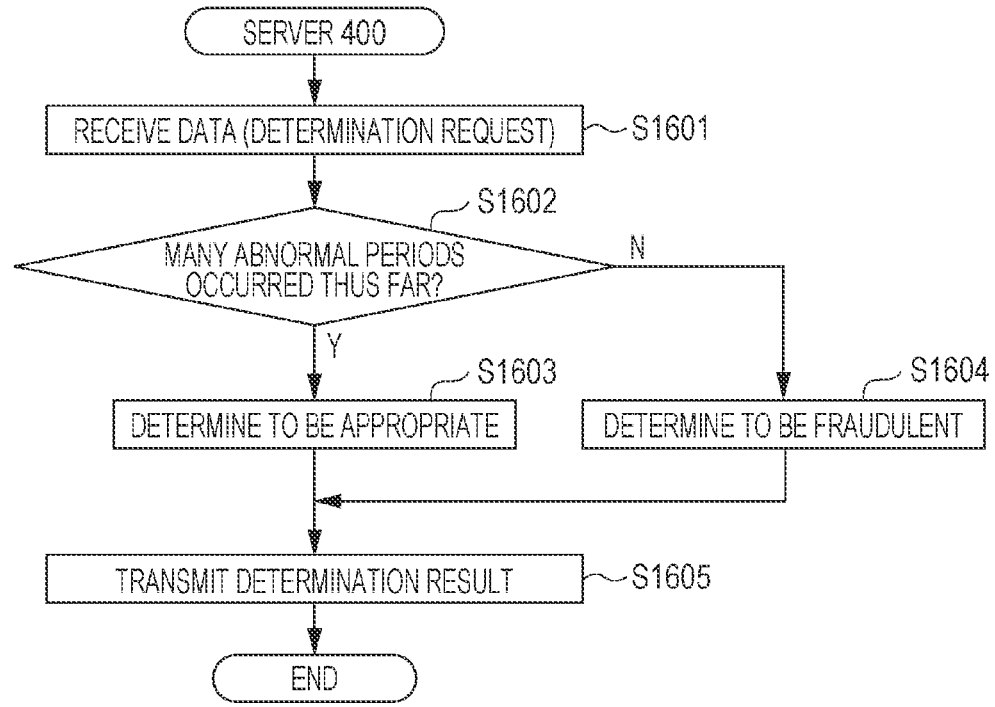
FIG. 30 is a flowchart illustrating an example of a determination process in a server.

FIG. 30 is a flowchart illustrating example operations of a determination process that the server 400 conducts when requested by the gateway 1300a for a determination of whether a frame to be determined is appropriate or fraudulent.

The server 400 receives data for a determination request (information such as the message ID of the frame to be determined, the content of the data field, and the reception timing (time)) (step S1601).

Based on the vehicle data (see FIG. 25), the server 400 checks whether or not many (a certain number or more) abnormal periods have occurred thus far for frames with the message ID of the frame to be determined (step S1602), and 9 many abnormal periods have occurred, the server 400 determines that the frame to be determined is appropriate (step S1603). On the other hand, if many abnormal periods have not occurred, the server 400 determines that the frame to be determined is fraudulent (step S1604).

After step S1603 or step S1604, the server 400 transmits a determination result regarding whether the frame to be determined is appropriate or fraudulent to the gateway 1300a from which the determination request originated (step S1605).

2.13 Frame Reception Process of ECU 1100c

Figure 31:
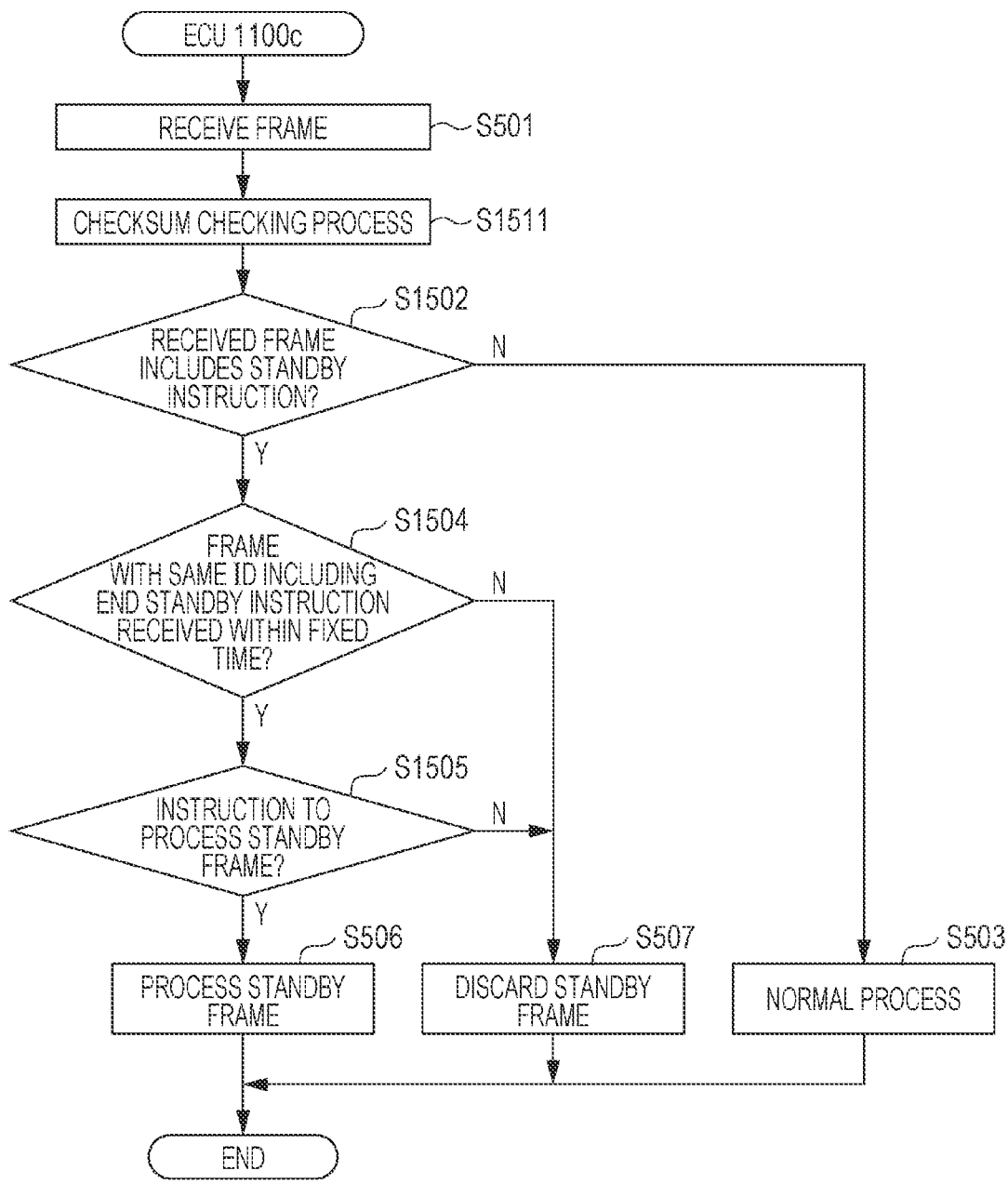
FIG. 31 is a flowchart illustrating an example of a frame reception process in an ECU according to Embodiment 2.

FIG. 31 is a flowchart illustrating an example of a frame reception process in the ECU 1100c. In the diagram, steps which are the same as the frame reception process of the ECU 100c indicated in Embodiment 1 (see FIG. 19) are denoted with the same signs, and the description thereof will be reduced or omitted as appropriate herein.

The ECU 1100c conducts a checksum checking process for checking the checksum inside the data field of the frame received in step S501 (step S1511). According to the checksum checking process, if a standby instruction, a cancel standby instruction, or a discard instruction is incorporated into the checksum, the relevant instruction is extracted.

Next, the ECU 1100c determines whether or not a standby instruction is included in the received frame (step S1502). If a standby instruction was extracted by the checksum checking process, it is determined that a standby instruction is included. If a standby instruction is not included (in other words, if control information indicating a standby instruction is not incorporated into the checksum), the ECU 1100c executes a process corresponding to the received frame (such as a functional process corresponding to data in the frame) (step S503).

In step S1502, if it is determined that a standby instruction is included, the ECU 1100c holds the frame received in step S501, and without starting the execution of a functional process for that frame, waits for a fixed time to receive a subsequent end standby instruction (cancel standby instruction or discard instruction) (step S1504). In other words, in step S1504, the ECU 1100c stands by to receive a frame having the same ID as the frame received in step S501, and in which control information indicating a cancel standby instruction or a discard instruction is incorporated into the checksum. Note that whether or not control information is incorporated is determined by performing a checksum checking process similar to step S1511. If an end standby instruction is not received after the fixed time elapses, the ECU 1100c cancels the standby for the held frame, and discards the frame (step S507).

In the case of determining that an end standby instruction was received in step S1504, the ECU 1100c determines whether or not the instruction is a process instruction, or in other words, a cancel standby instruction (step S1505). The cancel standby instruction is an instruction to start executing a functional process for the standby frame (the frame on standby). In other words, the ECU 1100c determines whether or not control information indicating a cancel standby instruction as an instruction to start execution of the processing of the frame for which execution is on standby is incorporated into the checksum. Note that whether or not control information indicating a cancel standby instruction is incorporated is determined by performing a checksum checking process similar to step S1511.

In step S1505, in the case of judging that an instruction to cancel standby is indicated, the ECU 1100c cancels the standby state for the frame for which process execution is on standby, and starts execution of a functional process corresponding to the frame (step S506). Also, in step S1505, in the case of determining that control information indicating an instruction not to cancel standby but instead to discard is incorporated into the checksum, the ECU 1100c discards the frame on standby (step S507).

2.14 Checksum Checking Process of ECU 1100c

Figure 32:
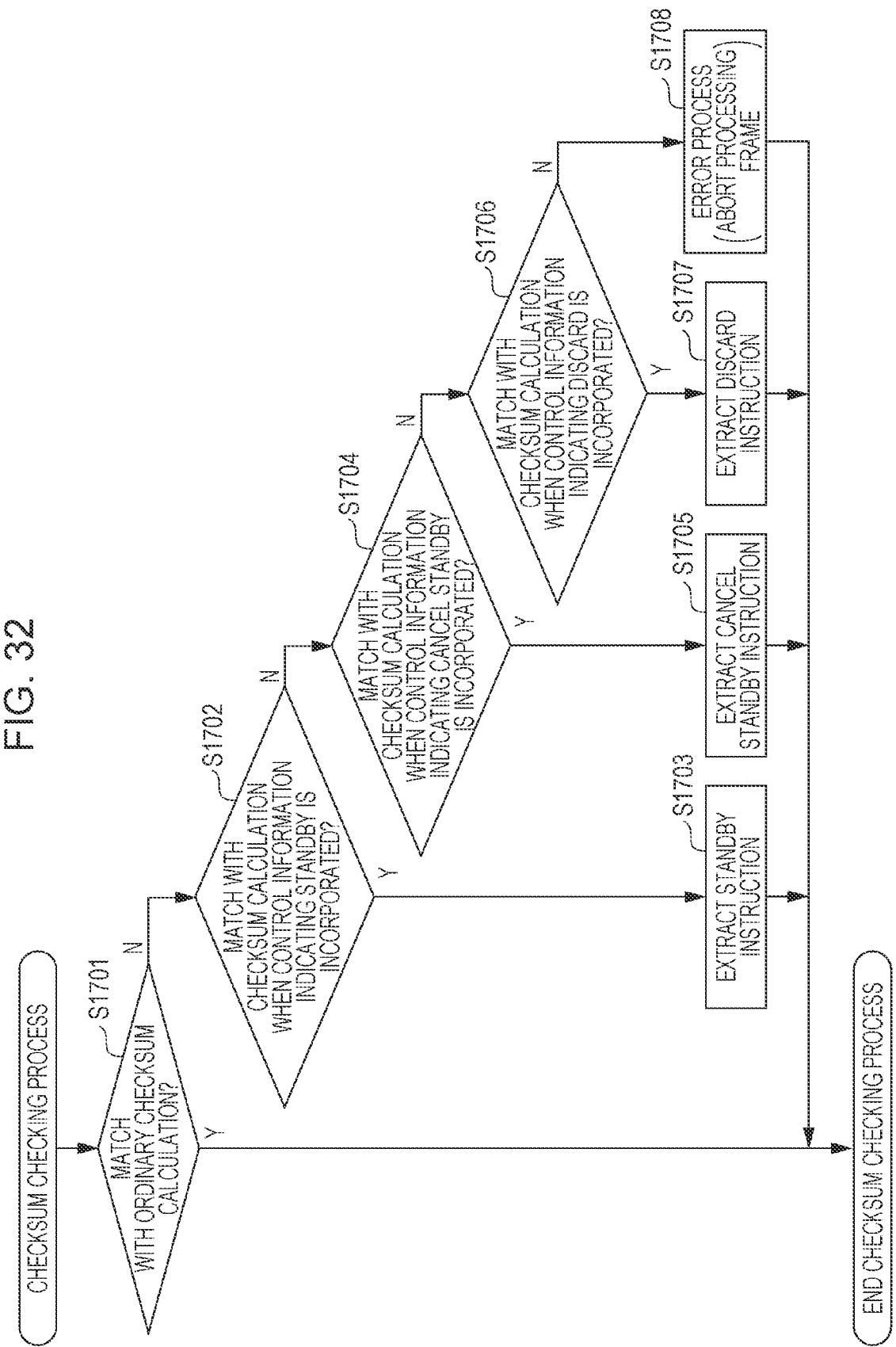
FIG. 32 is a flowchart illustrating an example of a checksum checking process in an ECU according to Embodiment 2.

FIG. 32 is a flowchart illustrating an example of a checksum checking process in the ECU 1100c.

The ECU 1100c performs ordinary calculations to compute a checksum as illustrated in FIG. 22 using the message ID, the DLC, and the data included in a received frame, and checks whether or not the ordinary calculation result matches the checksum inside the received frame (step S1701). In the case of a match, control information such as a standby instruction is not incorporated into the checksum.

In step S1701, if the checksum inside the received frame does not match the ordinary checksum calculation result, the ECU 1100c performs calculations to compute a checksum based on the message ID, the DLC, and the data included in the received frame, as well as the control information of a standby instruction in which one bit of the portion padding the DLC is set to "1", and checks whether or not the calculation result matches the checksum inside the received frame (step S1702). In the case of a match, the control information of a standby instruction is incorporated into the checksum, and the ECU 1100c extracts the standby instruction (step S1703).

In step S1702, if the checksum inside the received frame does not match the calculation result for when the control information of a standby instruction is incorporated into the checksum, the ECU 1100c performs calculations to compute a checksum based on the message ID, the DLC, and the data included in the received frame, as well as the control information of a cancel standby instruction in which another bit of the portion padding the DLC is set to "1", and checks whether or not the calculation result matches the checksum inside the received frame (step S1704). In the case of a match, the control information of a cancel standby instruction is incorporated into the checksum, and the ECU 1100c extracts the cancel standby instruction (step S1705).

In step S1704, if the checksum inside the received frame does not match the calculation result for when the control information of a cancel standby instruction is incorporated into the checksum, the ECU 1100c performs calculations to compute a checksum based on the message ID, the DLC, and the data included in the received frame, as well as the control information of a discard instruction in which yet another bit of the portion padding the DLC is set to "1", and checks whether or not the calculation result matches the checksum inside the received frame (step S1706). In the case of a match, the control information of a discard instruction is incorporated into the checksum, and the ECU 1100c extracts the discard instruction (step S1707).

In step S1706, if the checksum inside the received frame does not match the calculation result for when the control information of a discard instruction is incorporated into the checksum, the checksum verification for the received frame has failed, and thus the ECU 1100c performs an error process (such as aborting processing of the frame), and does not process the frame any further (step S1708).

2.15 Advantageous Effects of Embodiment 2

In the vehicle network system 20 according to Embodiment 2, the gateway 1300a conducts frame transmission in which control information is incorporated into the checksum inside the data field of a frame (data frame), and thereby controls the processing of a frame received at an ECU. The gateway 1300a may incorporate, into the checksum, control information that restricts processing in the ECU that receives the frame (for example, control information set to indicate a standby instruction). In this way, when forwarding a received frame, by having the gateway 1300a transmit a transmission frame in which the checksum is set to express a standby instruction, it becomes possible to secure enough time for a determination process to determine whether or not the received frame is appropriate. For this reason, enough time to communicate with the server 400 external to the vehicle and cause the server 400 to make a determination may be secured. Additionally, since the control information is incorporated into the area of the checksum that each ECU stores in a frame, the gateway 1300a does not lengthen the data length of a frame during frame forwarding. Additionally, if there is possibility that the received frame may be determined finally as appropriate, the forwarding of the frame is not stopped, but instead frame forwarding is conducted with a standby instruction attached, thereby preventing the receiving ECU from executing an abnormal process or the like due to the frame not arriving. In other words, by using the control information incorporated into the checksum of a frame during forwarding, the ECU that receives the frame becomes able to distinguish that the current state is not one in which a regular ECU that transmits a frame has malfunctioned and the frame will not arrive. Also, by having the gateway 1300a and the server 400 determine whether a frame is appropriate or fraudulent, it is not necessary for the individual ECUs 1100a to 1100e to include such a determination function, thereby making it possible to reduce costs for the system as a whole, and simplify operations such as updating fraud determination rules.

Other Embodiments

The above thus describes Embodiments 1 and 2 as illustrative examples of technology according to the present disclosure. However, the technology according to the present disclosure is not limited thereto, and is also applicable to embodiments obtained by the appropriate modification, substitution, addition, or removal of elements. For example, modifications like the following are also included as modes of the present disclosure.

(1) In the above embodiments, the data frame in the CAN protocol is stated in the standard ID format, but may also adhere to the extended ID format.

(2) In Embodiment 1 above, the control instruction data is included in the data field, but the control instruction data may be included anywhere inside the data field, or may be included in another field. For example, the control instruction data may also be included in an area such as the extended ID field, or part of the DLC field. The extended ID field is a field in the extended ID format that stores an 18-bit extended ID, following after a 1-bit identifier extension (IDE) bit that itself follows after a 1-bit substitute remote request (SRR) after the 11-bit field that stores the base ID.

(3) In Embodiment 2 above, the gateway 1300a is configured to use control information expressing a standby instruction or the like to compute a checksum so that control information indicating a standby instruction, a cancel standby instruction, or a discard instruction is incorporated into the checksum inside the data field of a frame. However, the area in the control information is incorporated may also be another area inside the frame. For example, the control information may also be incorporated into the CRC field, for example, and in the case in which an ECU sets a message authentication code (MAC) inside the frame, the control information may also be incorporated into the MAC. The MAC is generated by utilizing a shared key held among the gateways, based on a counter or the like that is counted every time a frame is transmitted, and the control information may be included in the formula for generating the MAC. Also, the checksum may be included anywhere inside the data field, or may be included outside the data field, such as in the extended ID field, for example.

(4) In Embodiment 1 above, an example is given in which control instruction data set with an active end standby instruction flag is transmitted as a new frame having the same ID as the frame that was received and held on standby. However, the control instruction data may also be included in a transmission frame when forwarding the next frame transmitted from the ECU 100*a*. Additionally, in Embodiment 1, an example is given in which the control instruction data uses the end standby instruction flag to indicate whether to cancel standby or discard the immediately previous frame, but data indicating an arbitrary number of frames back may also be included to specify the frame for which to cancel standby or discard. Additionally, in Embodiment 1, the gateway 300*a* transmits a frame indicating a cancel standby instruction according to the result of the determination in step S401, but may otherwise transmit a frame indicating a cancel standby instruction or a discard instruction based on a result of executing an arbitrary fraud determination algorithm. Additionally, in Embodiment 1, an example is given in which the frame on standby is discarded if the receiving ECU 100*c* does not receive a frame with the same ID as the frame on standby within a fixed time, but factors such as the number of frames to discard and the fixed time may be set arbitrarily. In addition, when the gateway 300*a* transmits a frame including a standby instruction, the time to standby and other instruction content may also be included in the frame. Consequently, if the time to standby elapses, the ECU is able to discard the frame that had been held on standby without waiting any longer for a frame indicating a cancel standby instruction or a discard instruction, and efficiently utilize areas such as the memory for holding frames.

(5) The gateway device, such as the gateway 300*a*, 300*b*, 1300*a*, and 1300*b* in the foregoing embodiments, may be any type of device insofar as the device includes a function of forwarding a received frame to a bus. For example, the gateway device may also be an ECU such as a head unit that receives a frame from a device external to the vehicle, and forwards the frame to one of the buses on the vehicle network. Herein, the forwarding may be the transmission of a frame generated on the basis of the received frame (data), or the partial modification and transmission of the content of the received frame. For example, an ECU that receives a frame with a specific message ID, modifies the message ID or part of the data field, and retransmits the frame, is a gateway device.

(6) The CAN protocol indicated in the foregoing embodiments refers to the CAN protocol in a broad sense, and also encompasses derivative protocols such as time-triggered CAN (TTCAN) and CAN with flexible data rate (CANFD).

(7) In cases in which the gateway device indicated in the foregoing embodiments (such as the gateway 300*a* or 1300*a*, for example) forwards frames to multiple buses, the gateway device may be configured to include control information indicating a standby instruction (such as control instruction data in which a standby flag is set to indicate a standby instruction, or a checksum computed with the addition of a standby instruction bit, for example) only for frames to forward to a specific bus (such as a major bus, for example).

(8) In Embodiment 2 above, an example is given in which the gateway device (the gateway 1300*a*, for example) includes an external communication unit 1351, but the gateway may also communicate via a head unit or another ECU (a device having a function of communicating outside the vehicle) connected to the vehicle network. A head unit is an ECU including a function of communicating with equipment external to the vehicle, for the purpose of functions such as multimedia playback or car navigation, for example.

(9) The ECUs 100*a* to 100*e* indicated in Embodiment 1 above may also include control instruction data (such as setting a standby flag to indicate that standby is unnecessary, or setting the end standby instruction existence flag to indicate absence, for example) in a frame to transmit to a bus. In this case, the gateway such as the gateway 300*a* may modify the content of the control instruction data when forwarding that frame. Note that the addition of control instruction data may be limited to frames having a specific message ID. Note that in an ECU that receives a frame, since the data length of frames normally transmitted to the ECU is predetermined for each message ID, it is possible to distinguish whether or not control instruction data has been added by the gateway, based on the DLC.

(10) The gateway device indicated in the foregoing embodiments includes control information (including control instruction data indicating a fixed value) into a transmission frame related to forwarding a received frame. The control information may be first control information, which is included in a transmission frame transmitted when a frame is received, or second control information, which is included in a transmission frame transmitted after the frame is received, and which is based on a final determination result of whether or not the received frame is appropriate, for example. The first control information is a standby instruction, for example, which instructs the ECU receiving the frame including the first control information to delay the start of the execution of a process corresponding to that frame until a frame including information related to the processing method for that frame is received. Additionally, the standby instruction instructs the ECU receiving the frame including the first control information to deter the execution of processing corresponding to that frame until a certain condition (a condition such as receiving a frame including the second control information, or the elapsing of a fixed time) is satisfied. Note that the first control information may also be considered to indicate an advance notice of subsequent instructions about how to handle the frame including the first control information (a report of a situation in which a final decision about whether or not that frame is appropriate has not yet been made). Additionally, the second control information is determined according to a final determination result regarding a frame received by the gateway device, and is a cancel standby instruction instructing the ECU to start executing the process for that frame, a discard instruction instructing the ECU to discard that frame, or the like.

(11) In Embodiment 1 above, an example is given in which the gateway 300*a* performs a final determination process that requires time to determine (decide) whether or not a received frame is appropriate, whereas in Embodiment 2, an example is given in which the server 400 performs a determination process that requires time to determine whether or not a frame received by the gateway 1300*a* is appropriate. Besides the above, a gateway device such as the gateway 300a or the 1300a may also cause another ECU to perform the determination (decision) of whether or not a received frame is appropriate. In this case, the frame transmitting and receiving unit 310 that acts as a receiving unit for receiving a frame receives the result of a determination (decision) made by another ECU. Additionally, the frame transmitting and receiving unit 310 may perform actions such as transmitting a frame indicating a cancel standby instruction or a discard instruction, according to the result of the determination about whether or not the received frame is appropriate. At this point, the frame transmitting and receiving unit 310 acts as a transmitting unit that transmits, to a bus, a frame including control information related to a restriction on processing after a frame is received. When a frame is received by the receiving unit, the transmitting unit transmits the frame including first control information to a bus if the certain condition is satisfied, and transmits the frame without including first control information to the bus if the certain condition is not satisfied. After transmitting the frame with included first control information, the transmitting unit transmits, to the bus, a frame including second control information related to a processing method for that frame according to the result of a decision about whether or not that frame is appropriate, for example. The certain condition is a condition that is satisfied in a situation in which a received frame is decided to be appropriate or not after that frame has been forwarded, or in other words, a condition in which the frame cannot be determined to be appropriate or not rapidly when the frame is received, for example, but the certain condition may also be another condition. Additionally, the transmitting unit may also be configured to express the first control information in an area of the frame (for example, the checksum area) that stores data reflecting the content of at least part of the data field.

(12) Each of the ECUs (including the gateways) in the above embodiments is taken to be a device including components like digital circuits, such as a processor and memory, analog circuits, and communication circuits, but may also include other hardware structural elements, such as a hard disk device, a display, a keyboard, and a mouse. Additionally, instead of realizing functions in software by having a processor execute a control program stored in memory, such functions may also be realized by special-purpose hardware (such as digital circuits).

(13) Some or all of the structural elements constituting each device in the above embodiments may also be configured as a single system large-scale integration (LSI) chip. A system LSI chip is a multi-function LSI chip fabricated by integrating multiple components onto a single chip, and specifically is a computer system including a microprocessor, ROM, RAM, and the like. A computer program is recorded in the RAM. The system LSI chip achieves the functions thereof as a result of the microprocessor operating in accordance with the computer program. In addition, the respective units of the structural elements constituting each of the above devices may be realized individually as separate chips, or as a single chip that includes some or all structural elements. Also, although system LSI is discussed herein, the circuit integration methodology may also be referred to as IC, LSI, super LSI, or ultra LSI, depending on the degree of integration. Furthermore, the circuit integration methodology is not limited to LSI, and may be also be realized with special-purpose circuits or general-purpose processors. A field-programmable gate array (FPGA) capable of being programmed after LSI fabrication, or a reconfigurable processor whose internal LSI circuit cell connections and settings may be reconfigured, may also be used. Furthermore, if circuit integration technology that may be substituted for LSI appears as a result of progress in semiconductor technology or another derived technology, obviously the new technology may be used to integrate the function blocks. Biotechnology applications and the like are also a possibility.

(14) Some or all of the structural elements constituting each of the above devices may also be configured as an IC card or a separate module that may be Inserted into each device. The IC card or the module is a computer system made up of components such as a microprocessor, ROM, and RAM. The IC card or the module may also include the advanced multi-function LSI chip discussed above. The IC card or the module achieves the functions thereof as a result of the microprocessor operating in accordance with the computer program. The IC card or the module may also be tamper-resistant.

(15) An aspect of the present disclosure may also be treated as a method, such as a communication method related to frame forwarding in the vehicle network discussed above. For example, a communication method includes a receiving step of receiving a frame (first frame), and when the first frame is received in the receiving step, a transmitting step of including, in a transmission frame (second frame) including information based on the content of the first frame, first control information related to a restriction on processing after reception of the second frame, and transmitting the second frame to a bus. In addition, this method may be taken to be a computer program realized by a computer, or a digital signal containing a computer program. In addition, one aspect of the present disclosure may be realized by recording the computer program or the digital signal onto a computer-readable recording medium, such as a flexible disk, hard disk, CD-ROM, MO, DVD, DVD-ROM, DVD-RAM, Blu-ray (registered trademark) Disc (BD), or semiconductor memory, for example. In addition, one aspect of the present disclosure may also be taken to be the digital signal recorded on these recording media. In addition, one aspect of the present disclosure may also be realized by transmitting the computer program or the digital signal over an electrical communication link, a wired or wireless communication link, a network such as the internet, or a data broadcast. In addition, one aspect of the present disclosure may also be a computer system equipped with a microprocessor and memory, in which the memory records the above computer program, and the microprocessor operates according to the computer program. In addition, one aspect of the present disclosure may also be carried out by another independent computer system by recording and transporting the program or the digital signal on a recording medium, or transporting the program or the digital signal over a medium such as a network.

(16) Embodiments realized by arbitrarily combining the respective structural elements and functions indicated in the above embodiments and the above modifications are also included in the scope of the present disclosure.

INDUSTRIAL APPLICABILITY

The present disclosure is usable to judge whether or not a frame transmitted on a vehicle network is appropriate, and suitably conduct a process corresponding to the frame.

What is claimed is:

1. A gateway device for a vehicle network system in a vehicle, the vehicle network system including a network, an electronic control unit connected to the network, and the gateway device connected to the network and configured to communicate outside the vehicle, the gateway device comprising:
one or more memories; and
circuitry which, in operation, performs operations including:
receiving a first frame from outside the vehicle;
determining whether or not the first frame is appropriate;
generating, when the first frame is not determined to be appropriate, a second frame, the second frame including first control information and additional information based on content of the first frame, the first control information including a restriction on processing; and
transmitting the second frame to the network,
wherein the first control information, in the second frame, restricts processing of the additional information included in the second frame by the electronic control unit, after the second frame is received by the electronic control unit.

2. The gateway device according to claim 1, wherein when the first frame is not determined to be appropriate, the operations further include:
after transmission of the second frame, transmitting a third frame to the network, the third frame including second control information, the second control information including a processing method of the second frame.

3. The gateway device according to claim 2, wherein after the transmission of the second frame, a second determination is made as to whether the first frame is appropriate or not, and
the second control information depends on a result of the second determination about whether the first frame is appropriate or not.

4. The gateway device according to claim 3, wherein the second frame is generated when the circuitry is undecided as to whether or not the first frame is appropriate.

5. The gateway device according to claim 3, wherein the operations further include:
receiving the result of the second determination about whether or not the first frame is appropriate, the second determination being made by the electronic control unit.

6. The gateway device according to claim 3, wherein the operations further include:
transmitting a request for the second determination about whether or not the first frame is appropriate to a device external to the vehicle, and
receiving the result of the second determination about whether or not the first frame is appropriate from the external device.

7. The gateway device according to claim 2, wherein the second control information includes an indication to start execution of the processing of the additional information included in the second frame.

8. The gateway device according to claim 2, wherein the second control information includes an indication to discard the second frame.

9. The gateway device according to claim 1, wherein the first control information includes an indication causing the electronic control unit, that receives the second frame including the first control information, to delay starting of execution of a process corresponding to the second frame until a third frame including a processing method of the second frame is received.

10. The gateway device according to claim 1, wherein the first control information includes an indication causing the electronic control unit, that receives the second frame including the first control information, to deter execution of a process corresponding to the second frame until a certain condition is satisfied.

11. The gateway device according to claim 1, wherein the restriction on processing, included in the first control information of the second frame, restricts the electronic control unit from processing the additional information included in the second frame, after the second frame is received by the electronic control unit.

12. A vehicle network system in a vehicle, the vehicle network system comprising:
a network;
an electronic control unit connected to the network; and
a gateway device connected to the network and configured to communicate outside the vehicle,
wherein the gateway device includes one or more memories and circuitry which, in operation, performs operations including:
receiving a first frame transmitted from outside the vehicle;
determining whether or not the first frame is appropriate;
generating, when the first frame is not determined to be appropriate, a second frame, the second frame including first control information and additional information based on content of the first frame, the first control information including a restriction on processing; and
transmitting the second frame to the network, and
the first control information, in the second frame, restricts processing of the additional information included in the second frame by the electronic control unit, after the second frame is received by the electronic control unit.

13. A communication method for a gateway device in a vehicle network system, the vehicle network system being in a vehicle, the vehicle network system including a network, an electronic control unit connected to the network, and the gateway device connected to the first network and configured to communicate outside the vehicle, the communication method being conducted by the gateway device and comprising:
receiving a first frame from outside the vehicle;
determining whether or not the first frame is appropriate;
generating, when the first frame is not determined to be appropriate, a second frame, the second frame including first control information and additional information based on content of the first frame, the first control information including a restriction on processing; and
transmitting the second frame to the network,
wherein the first control information, in the second frame, restricts processing of the additional information included in the second frame by the electronic control unit, after the second frame is received by the electronic control unit.

* * * * *